Nov. 26, 1957 P. MOLLA 2,814,332
MACHINE FOR MANUFACTURING FORMED PAPER
Filed July 5, 1955 11 Sheets-Sheet 6
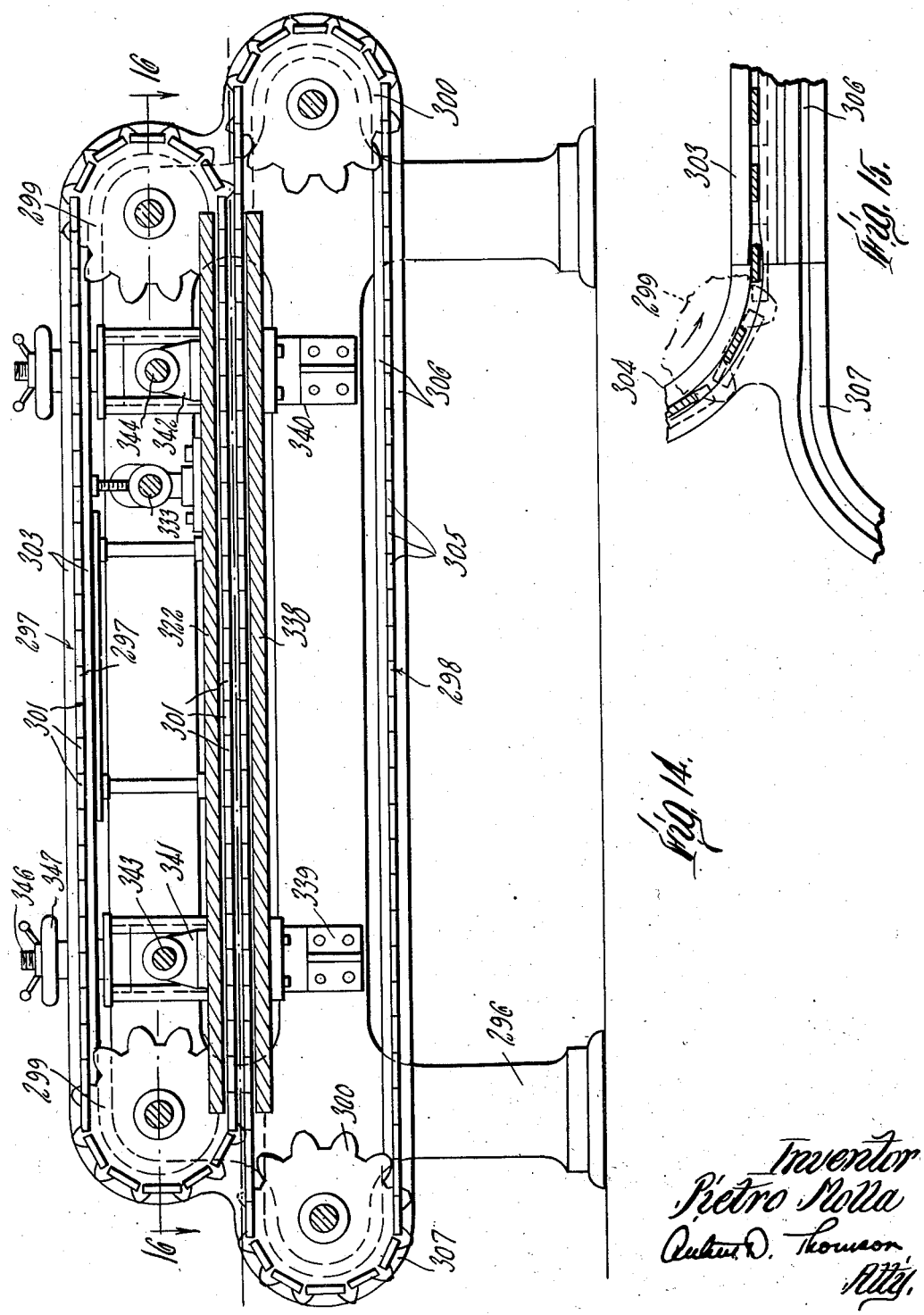

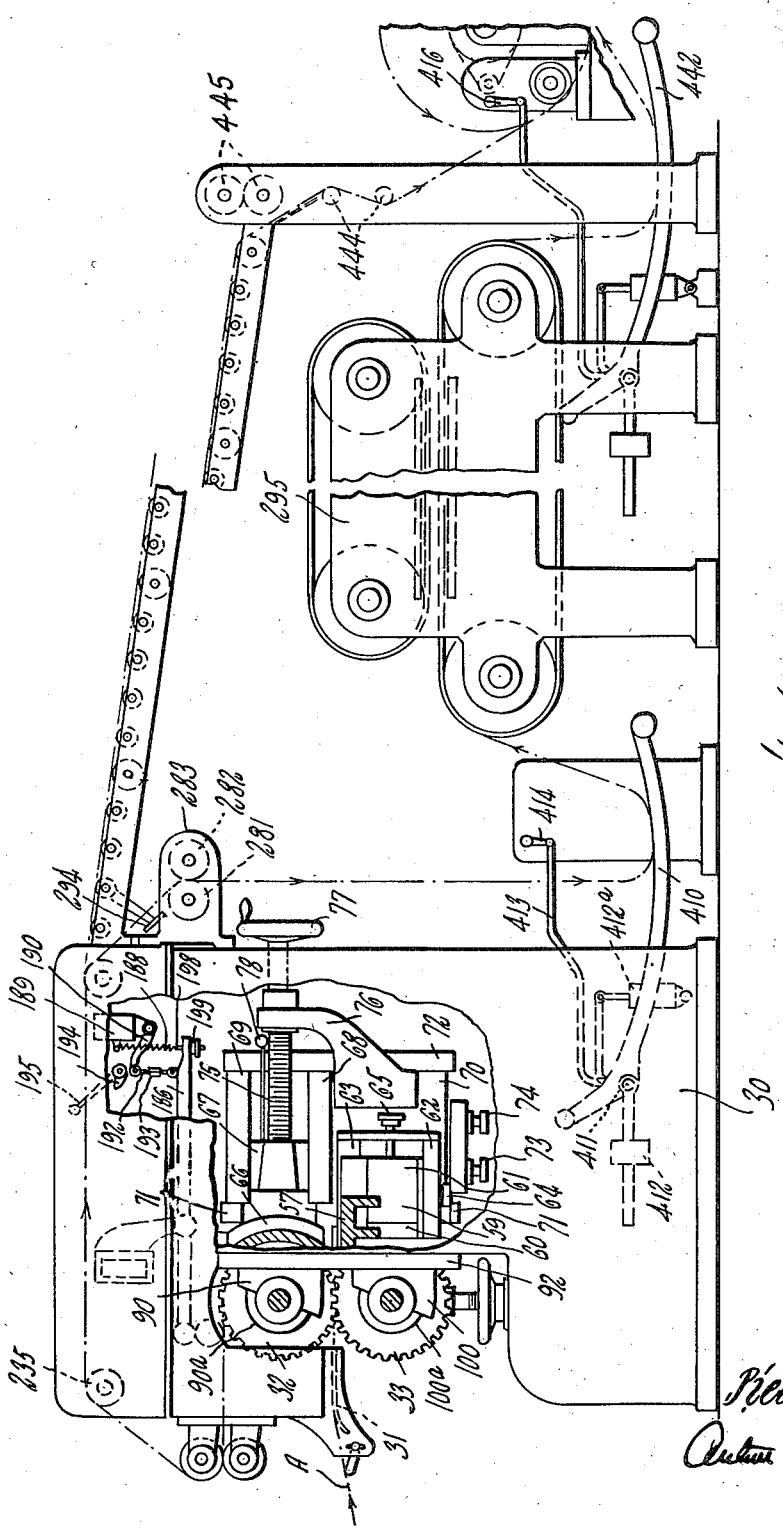

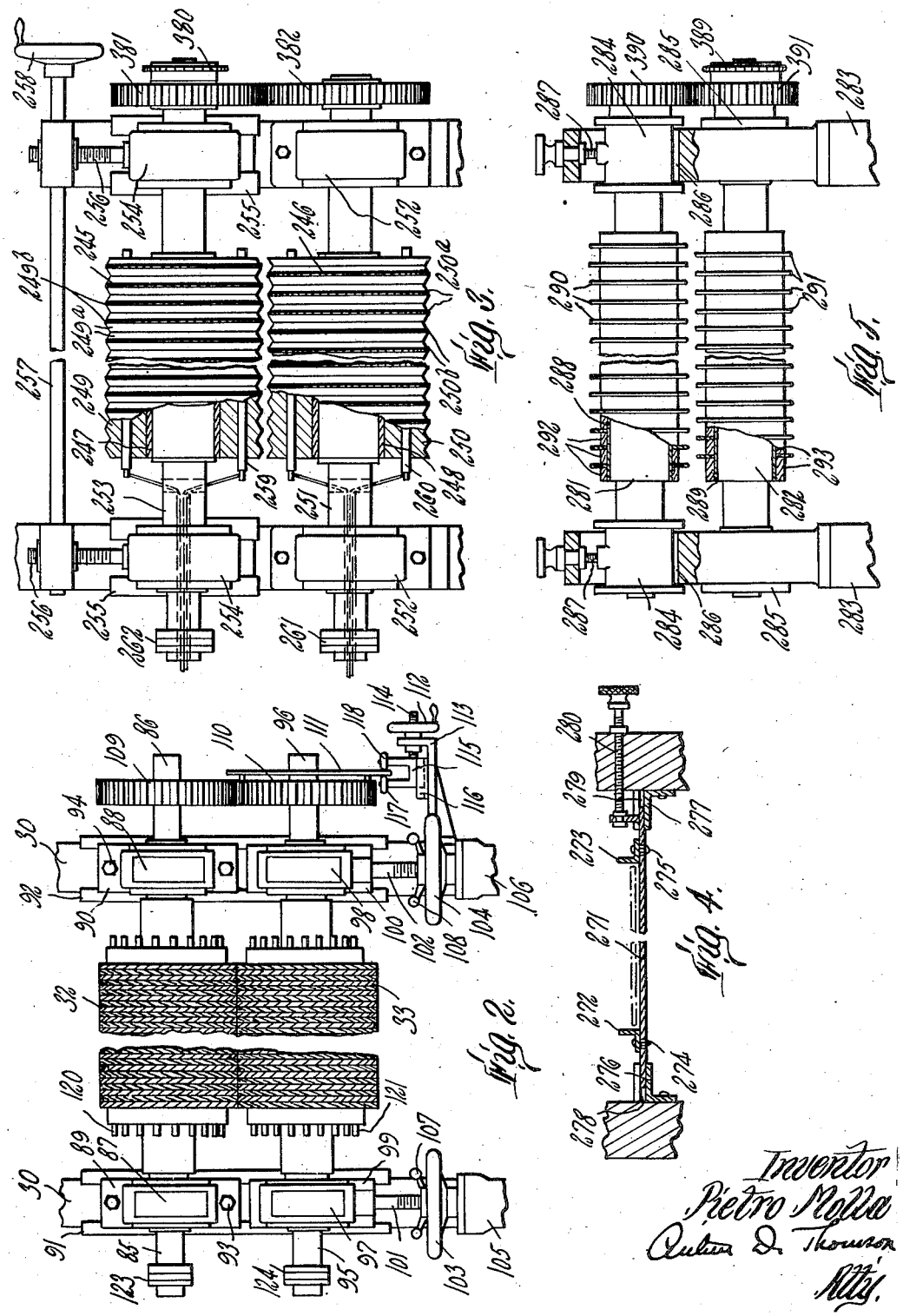

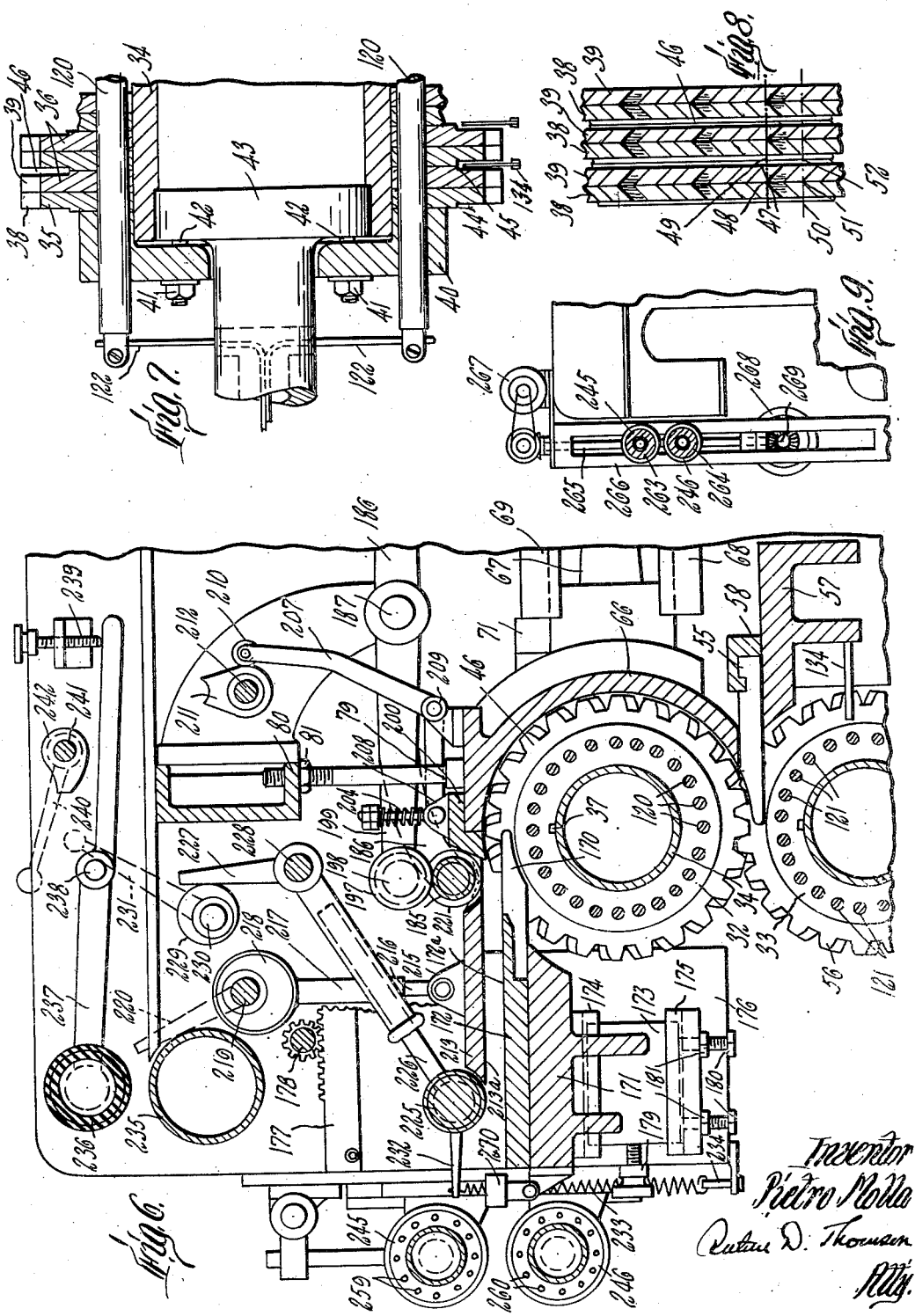

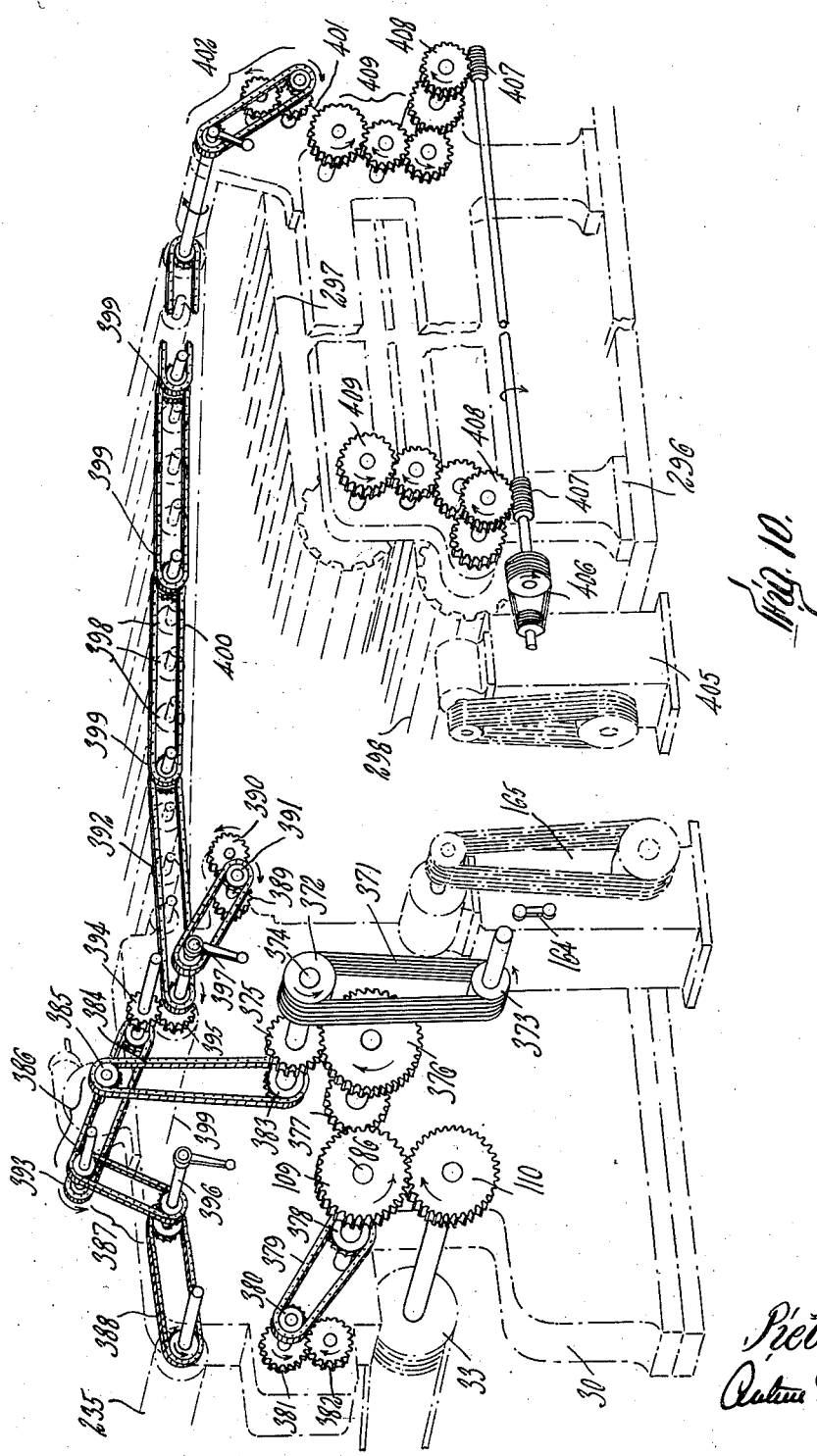

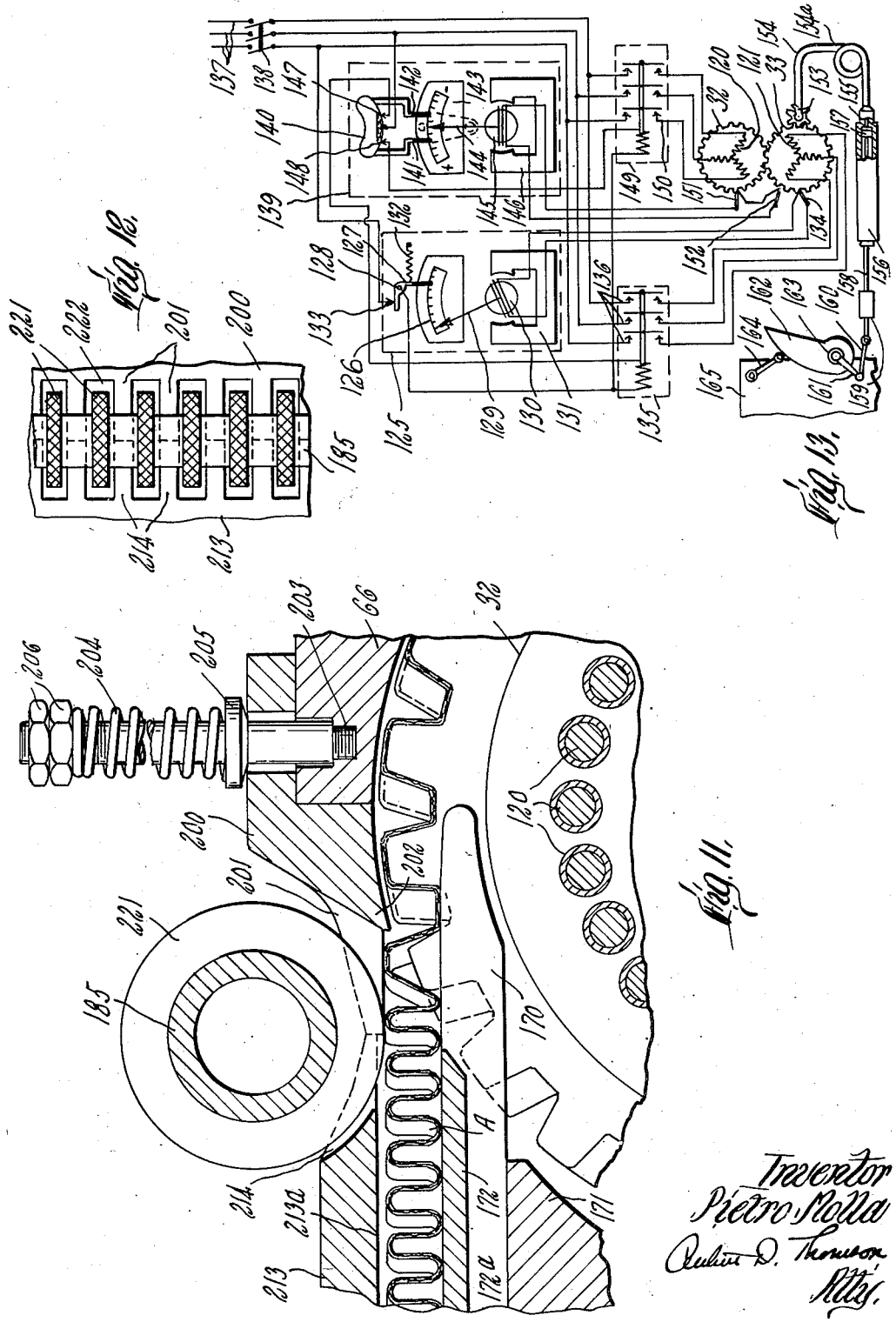

Nov. 26, 1957 P. MOLLA 2,814,332
MACHINE FOR MANUFACTURING FORMED PAPER
Filed July 5, 1955 11 Sheets-Sheet 7
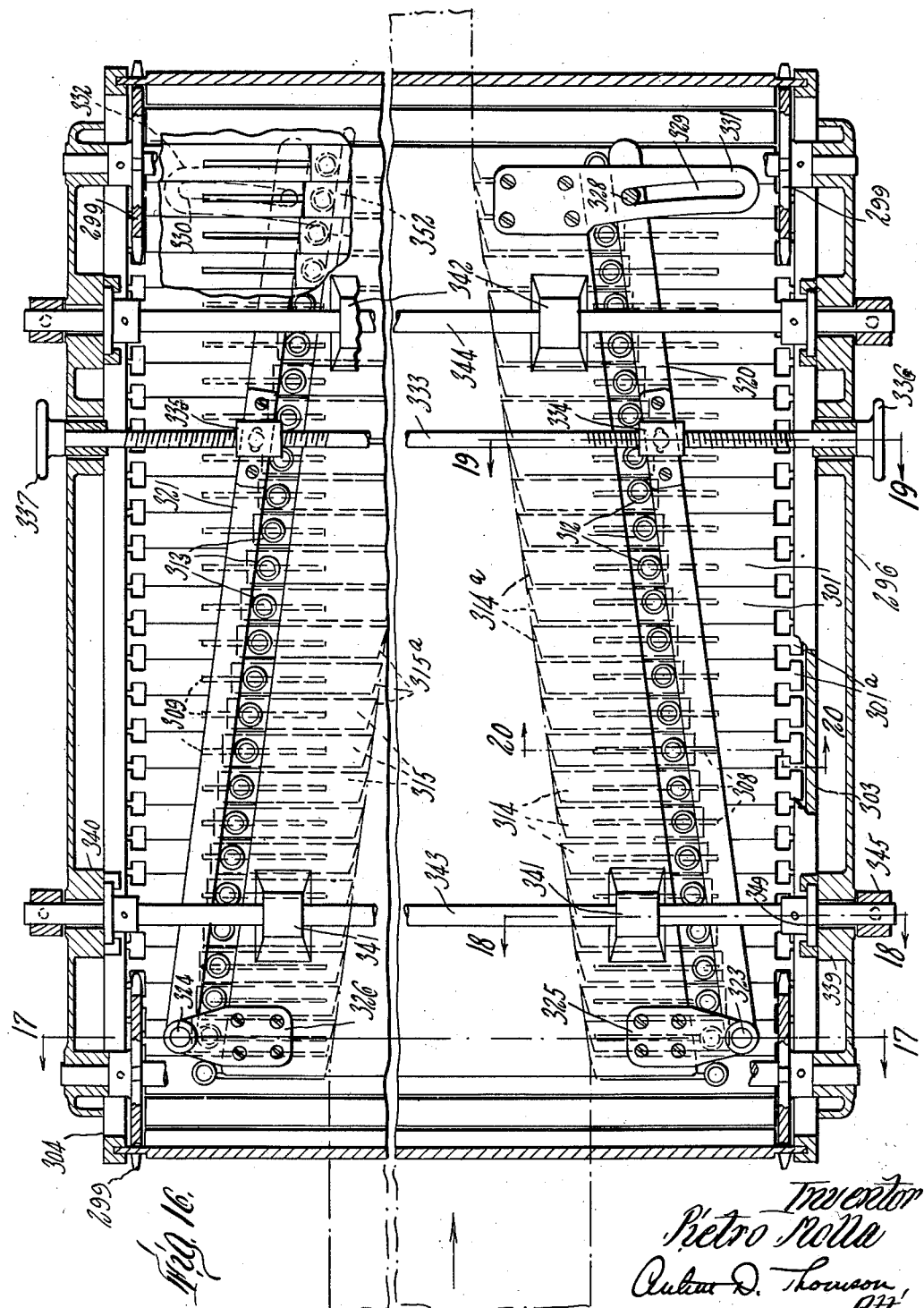
Inventor
Pietro Molla

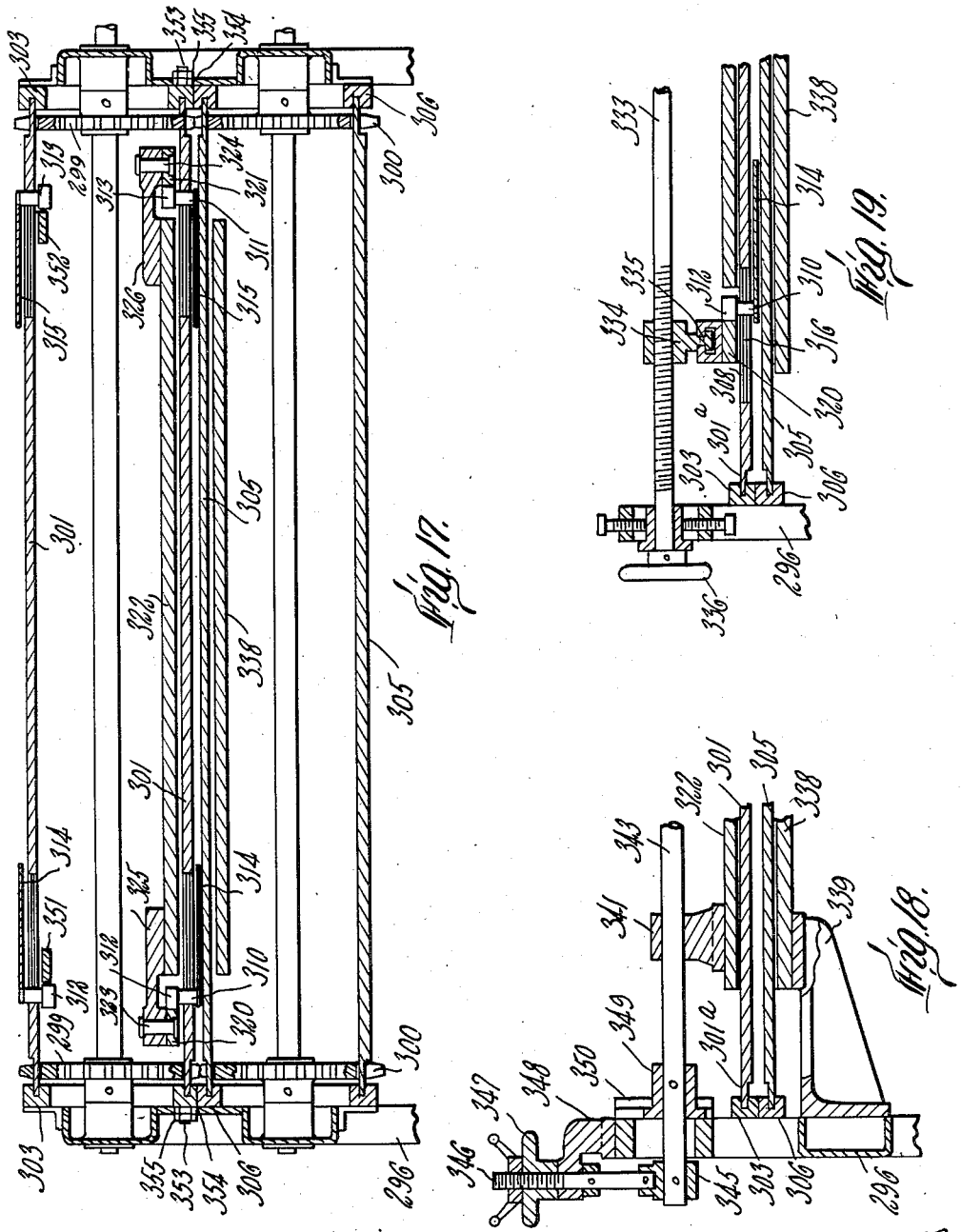

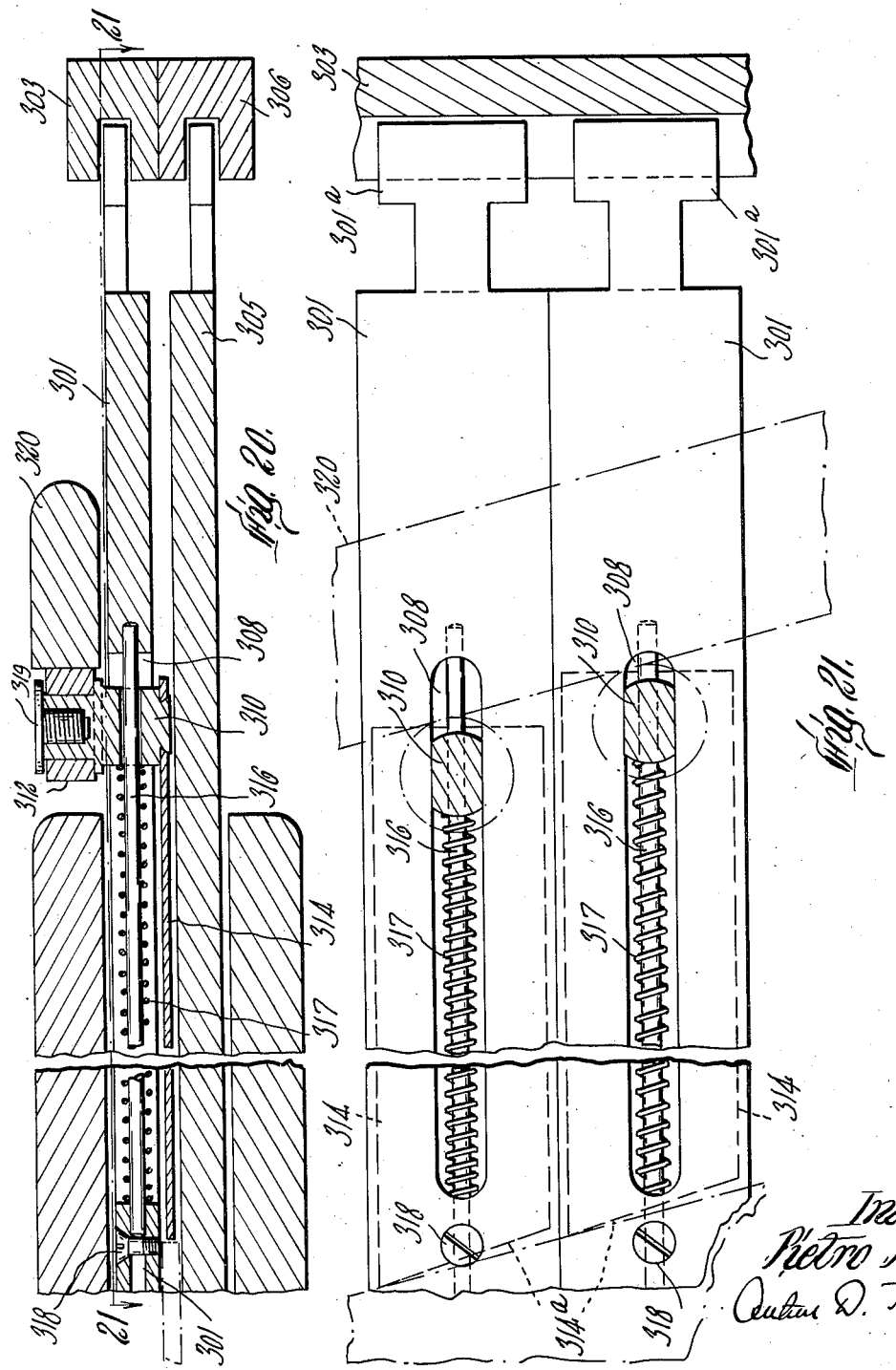

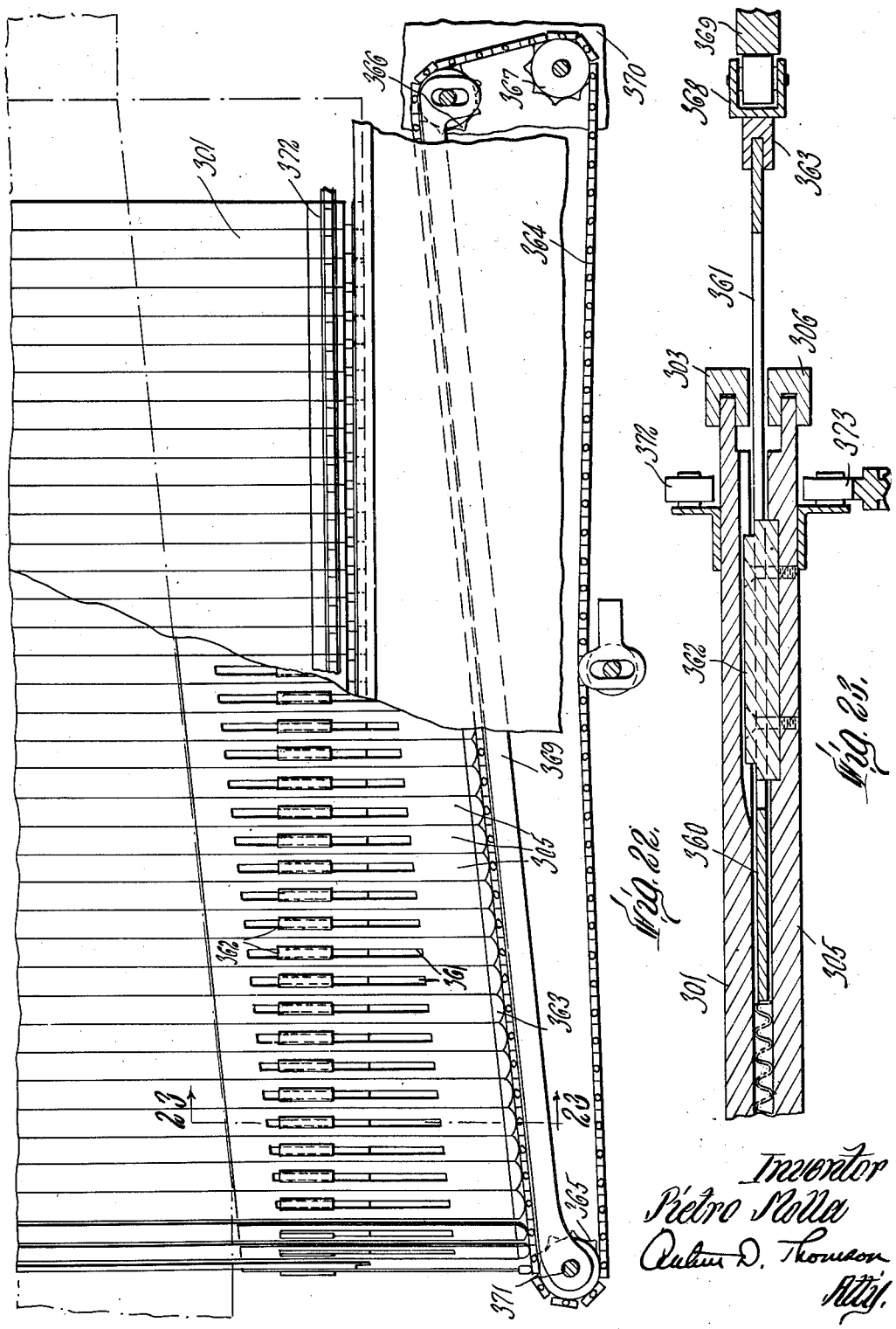

Nov. 26, 1957 P. MOLLA 2,814,332
MACHINE FOR MANUFACTURING FORMED PAPER
Filed July 5, 1955 11 Sheets-Sheet 11

Inventor
Pietro Molla
Atty.

United States Patent Office 2,814,332
Patented Nov. 26, 1957

2,814,332

MACHINE FOR MANUFACTURING FORMED PAPER

Pietro Molla, Pontenuova de Magenta, Italy, assignor to Società per Azioni Fabbriche Fiammiferi ed Affini, Milan, Italy, a corporation of Italy Application July 5, 1955, Serial No. 519,781

Claims priority, application Italy July 12, 1954

23 Claims. (Cl. 154—30)

This invention relates in general to machines for manipulating flexible sheet material, such as paper, to produce formed sheets of a type which may be broadly classified as "corrugated," and pertains more particularly to machines for manufacturing the various novel forms of paper described in copending patent applications Serial No. 470,469, filed November 22, 1954, and Serial No. 520,083, filed July 5, 1955, both filed by Camillo Villoresi.

The first of the aforesaid patent applications describes two general types of formed paper, one of which is referred to herein as the "basic rigid" type and the other as the "basic elastic" type. In producing the basic rigid type, paper is formed by hot impression into regular zigzag rows of undulations, the median lines of which are parallel and run in what is referred to as the "transverse" direction of the paper. The direction, in the general plane of the paper, perpendicular to the transverse direction, is consistently referred to in the aforesaid copending applications as the "longitudinal" direction, and these terms are similarly used herein. The longitudinal direction corresponds, in the machine here disclosed, to the direction of travel of the paper through the machine.

In the basic rigid type of paper, the form of the undulations in cross-section, is approximately trapezoidal, that is, the peaks and valleys are somewhat flattened, rather than rounded, as in ordinary corrugated paper, and the zigzags are so proportioned that the paper remains straight along transverse lines which correspond to the median lines of the peak and valley strips. The lines constitute natural fold lines along which the sheet may be pleated to produce the basic elastic type of paper.

The second of the aforesaid patent applications describes a number of other varieties of paper, referred to therein as types I, II, IIIA, IIIB, IIIC, and IV, all of which are made by performing further operations on one of the two basic types described in the first application, to impart flexibility, or both flexibility and elasticity in the transverse direction.

As the types of paper which the machine here described is adapted to produce are new to the paper industry, machines for production of such papers are also a recent development, and I am not aware of any prior patented art except the Villoresi Italian Patent No. 472,644, dated July 26, 1952, in which the main elements of a machine for making the two basic types of the paper are described. The principal object of this invention, therefore, is to provide an efficient machine capable of continuously and automatically producing, on a commercial scale, all the varieties of paper described in the two aforesaid copending applications. Other objects are to produce a machine which will operate on papers or other flexible sheets of various grades, weights, and compositions, which has provision for the fine adjustment and continuous control of factors which affect the quality and uniformity of the finished product, such as temperature, speed of run, and spacing and alignment of the mechanisms for performing the various operations, and which will manufacture the desired product economically and at high speed. Still another object is to provide a machine which can be readily set, without dismantling, to perform the particular sequence of operations necessary to produce any one of the types of paper described above. Further objects are to provide a machine for this purpose which will operate with a minimum of attention and is sufficiently durable and reliable to withstand long periods of use under normal factory conditions.

The machine consists essentially of the following mechanisms:

A pair of internally heated impressing rolls having meshing chevron-like teeth, which impart the characteristic zigzag undulations to the basic rigid type of paper, this operation being also the first step in the manufacture of all the other types, and a shield plate partly surrounding one of the rolls to hold the paper against the heated roll for sufficient time to give the impressions a permanent set; a braking roll which may be brought into engagement with the paper immediately after it leaves the impressing rolls and serves the purpose of folding the paper into pleats, thus converting the rigid basic type to the basic elastic type; a pair of braking plates, followed by a second braking roll, which cooperate to draw the pleats more tightly together after the paper leaves the first braking roll, when a very tight basic elastic type is required; a pair of heated crushing rolls, having a saw-tooth configuration in the transverse direction, used in the production of some varieties of the paper, to crush the paper on parallel longitudinal lines along the top and bottom, these lines corresponding to lines running through alternate vertices of the zigzags; a pair of finned scoring rolls, used in the production of one variety of the paper to score the paper along longitudinal lines on the top and bottom corresponding to lines running through alternate vertices of the zigzags; and a cross-pressing mechanism for progressively compressing the paper in the transverse direction.

The cross-pressing mechanism consists generally of a pair of conveyors formed of transverse flat links, disposed above and below the sheet of paper, a number of pairs of transversely sliding plates mounted on the links of one of the conveyors and arranged to engage the edges of the sheet, and a pair of slanting guides which cause the plates to move inward as they travel forward, thus progressively compressing the paper transversely as it travels between the conveyors.

Other features of the machine include control systems for varying the speed of the impressing rolls according to fluctuations in their temperature to compensate for variations in the rate of heat dissipation, and for maintaining the temperature differential between the two impressing rolls within tolerable limits, as well as means for accurately adjusting clearance and transverse mesh between the impressing rolls, and clearance of the shield plate. The machine may also include a set of drawing rolls for stretching the paper longitudinally to obtain an intermediate degree of tightness or weight per unt area in the finished product, as well as various guiding and adjusting devices.

The operations performed by this machine are described with particular reference to paper. It has been found, however, that many other flexible sheet materials including, for example, plastic sheets, such as cellophane, metal foils laminated to paper, and fabrics, can be manipulated and formed in the same manner. This machine is capable of processing such materials as well as a wide variety of papers, and it is understood that paper is referred to in this description merely as a typical example of the material processed. Although the papers which may be manufactured on this machine are primarily useful as protective wrapping or cushioning materials, many of the products have interesting decorative, acoustic and insulating properties. It will accordingly be understood that the word "paper," as used in the following description and in the appended claims, is intended to include equivalent flexible sheets capable of being formed in the manner herein disclosed.

In the drawings illustrating a preferred embodiment of the invention:

Fig. 1 is a side elevation, partly broken away and partly in cross-section, of a machine constructed according to the invention;

Fig. 2 is an enlarged view, partly broken away, of the impressing rolls as viewed from the "feed" end of the machine (the left-hand end in Fig. 1);

Fig. 3 is an enlarged view partly in cross-section, of the same end of the machine in the region of the crushing rolls;

Fig. 4 is a transverse cross-section, partly broken away, of a guide for aligning the paper as it enters the crushing rolls;

Fig. 5 is an enlarged transverse view, partly broken away and partly in cross-section, of the scoring rolls;

Fig. 6 is a longitudinal cross-section on an enlarged scale, of the upper left-hand part of the machine showing the arrangement of the impressing and pleating units, the crushing rolls and a pair of drawing rolls;

Fig. 7 is an enlarged detail, in transverse cross-section, of one end of one of the impressing rolls;

Fig. 8 is a development of a portion of the surface of one of the impressing rolls;

Fig. 9 is a diagrammatic side view of a modification of the mounting of the crushing rolls;

Fig. 10 is a diagrammatic perspective view of the drive system for the entire machine;

Fig. 11 is a fragmentary, sectional view on a greatly enlarged scale taken in the region of the first braking roll which converts the basic rigid type of paper to the basic elastic type;

Fig. 12 is a fragmentary plan view, on an enlarged scale, of the first braking roll;

Fig. 13 is a schematic electrical diagram showing the control system for the heating units of the impressing rolls, and the speed control of the rolls;

Fig. 14 is a longitudinal cross-section of the cross-pressing mechanism;

Fig. 15 is a fragmentary side view of one end of the guides for the conveyors of the cross-pressing mechanism;

Fig. 16 is a cross-section, partly broken away, taken along line 16—16 of Fig. 15;

Fig. 17 is a cross-section taken along line 17—17 of Fig. 16;

Fig. 18 is a fragmentary enlarged cross-section taken along line 18—18 of Fig. 16;

Fig. 19 is a fragmentary enlarged cross-section taken along line 19—19 of Fig. 16;

Fig. 20 is a fragmentary enlarged cross-section taken along line 20—20 of Fig. 16;

Fig. 21 is a fragmentary cross-section taken along line 21—21 of Fig. 20;

Fig. 22 is a fragmentary plan view of a modified form of the cross-pressing mechanism;

Fig. 23 is a fragmentary cross-section taken along line 23—23 of Fig. 22; and

Figure 24:
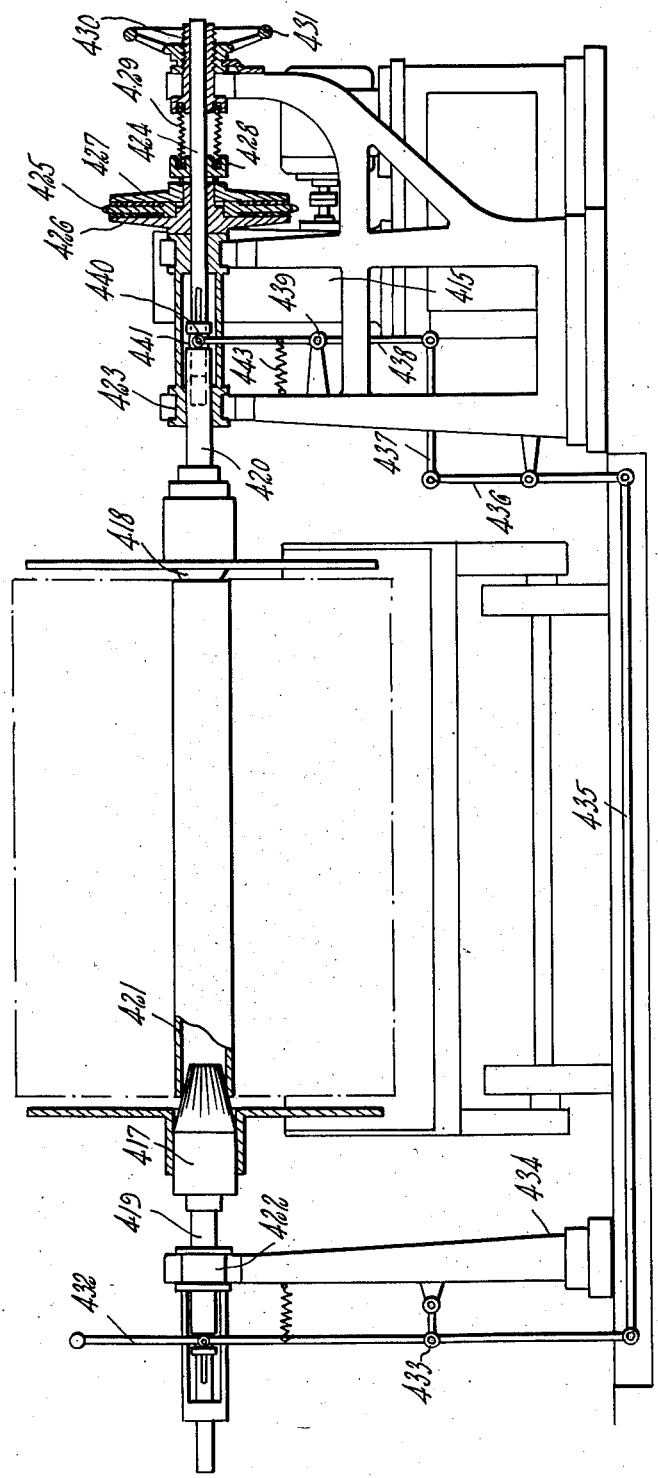
Fig. 24 is a transverse cross-section of the winder for the machine.

In Fig. 1, a flat sheet of paper, or other suitable sheet material, diagrammatically illustrated by the line A, is being fed into the left-hand end of the machine. The paper is continuously fed from rolls mounted on a suitable unwinding device (not shown). It is understood that two or more sheets which are to be laminated together may be fed simultaneously to the machine, and that the sheets may previously pass through other apparatus for the application, for example, of adhesives, coating or impregnating materials, or printing.

One group of parts of the machine, including the impressing rolls, braking rolls and plates, crushing rolls, drawing rolls, and scoring rolls, is mounted on a stationary frame generally indicated by the numeral 30. The paper passes first over a guide plate 31, and enters into the bite of the upper and lower impressing rolls 32 and 33, respectively, which form part of the impressing mechanism for performing the heat molding step by which the zigzag rows of undulations are impressed.

The construction of these rolls is shown in more detail in Figs. 2, 6, and 7. The upper roll 32, for example, consists of a tubular sleeve 34 on which are mounted a number of pairs of mating rings 35 and 36, which are keyed to the sleeve by means of a transverse key 37 on the sleeve. The rings have slanting peripheral teeth 38 and 39, respectively, the teeth on one ring of each pair being cut with a right-hand slant and those of the other ring with a left-hand slant. The entire set of toothed rings is secured on the sleeve, at the left-hand end of the upper roll, for example, as shown in Fig. 7, by means of a thrust ring 40, held in place by lock nuts 41 which engage studs 42, the latter being fixed to a flange 43 of the left-hand trunnion. The right-hand end of the roll is constructed in the same manner, and the lower roll is of the same construction as the upper.

The left-hand ring 35 of each pair of rings has a shoulder 44 on its left side, and the right-hand ring 36 has a shoulder 45. The shoulders of successive pairs engage so as to provide a groove 46, of a width equal to the combined thickness of shoulders 44 and 45, between each pair. The purpose of these grooves is to accommodate stripper fingers, the arrangement of which is described further herein. The teeth 38 and 39 are shown as generally trapezoidal in section, with flat tops and roots and sloping sides, so as to impart the generally trapezoidal shape exhibited by the rows of undulations on the basic rigid type of paper. The edges of the top faces are somewhat rounded or bevelled off to avoid cutting the paper. The transverse inclination of the teeth to right and left is symmetrical, and the teeth of each pair of rings are aligned across the entire surface of the roll, as illustrated in Fig. 8. The resulting roll surface consists, in effect, of a number of circumferential strips of herringbone or chevron-shaped teeth separated by grooves. As the grooves are relatively narrow, however, their effect on the paper is barely noticeable, and the impressions resulting from passing the paper between the meshed strips of teeth of the upper and lower rolls appear as continuous transverse zigzag rows.

The slanting teeth of the pairs of rings are here illustrated as having a 45° slope so as to produce zigzags with 90° vertices, which is representative of a pattern in which the basic rigid type of paper is commonly produced. The slope may be varied, however, to produce zigzags with obtuse or acute angles at their vertices. The size, shape and spacing of the teeth may also be varied according to the pattern desired. It will be noted in Fig. 8 that the tooth faces are so proportioned with respect to their slant and width of the rings that straight line 47 will intersect points 48, which are the junctions of the rear edges of the tooth faces of each pair, and also points 49, which are the imaginary junctions of the front edges of the tooth faces of successive pairs. Likewise, a straight line 50 will intersect points 51, which are the junctions of the rear edges of the roots of each pair and also points 52, which are the imaginary junctions of the front edges of the roots of successive pairs. These lines correspond to the transverse fold lines along which the basic elastic type of paper is pleated. Consequently, it is essential to construct the teeth so as to achieve this general relationship, for the production of the basic elastic type of paper and other types derived from it, although it will be understood that points 48 and 49 may be offset slightly to either side of line 47 to allow for the thickness of the paper, and points 51 and 52 may be similarly offset from line 50. The impressing rolls are also illustrated in somewhat schematic form, as the rolls on an actual machine may be a foot or more in diameter, while Fig. 8 shows the paper in approximately its actual size, and the actual rolls would therefore carry a much larger number of teeth than is shown, for example, in Fig. 6.

Immediately after the paper passes through the bite of the impressing rolls, it is sepaarted from the lower rolls by a set of stripper fingers 55. The left-hand ends of these fingers extend into the grooves 56 (corresponding to the grooves 46 of the upper impressing roll). The fingers are secured to a cast bracket 57, which runs transversely across the machine, by means of a transverse bar 58 suitably slotted to receive their right-hand ends. Bracket 57 is attached at one end, as shown in Fig. 1, to a plate 59 which slides between vertical ways 60 and 61 which are, in turn, mounted in horizontal ways 62 and 63 fixed to the frame of the machine. A screw 64, engaging plate 59 provides for vertical adjustment of the plate in ways 60 and 61 and a screw 65 provides for horizontal adjustment of the latter in ways 62 and 63. The mounting of the other end of bracket 57 (which would be the near end as viewed in Fig. 1) is similar in every respect. The stripper finger assembly can thus be adjusted both horizontally and vertically at each end for accurate alignment with respect to the impressing rolls.

On leaving the lower roll 33, the paper follows the upper roll 32 through about half a turn, and is held closely to the upper roll by a curved shield or guide plate 66 which is mounted to be concentric with the upper roll and clears the teeth by an amount slightly greater than the thickness of the paper. The clearance is on the order of a few thousandths of an inch and should be just enough to allow the paper to slide past the shield, but not enough to permit the paper to spring away from roll 32. As explained in detail in the Villoresi application Serial No. 470,469, the permanaent character of the zigzag impressions is believed to be due to the adherence of the paper to roll 32 for a substantial period at temperatures considerably higher than those used in conventional embossing or other paper forming processes, for example at temperatures in the region of 300° C., and the fact that the paper does not scorch at these temperatures is believed to be due to the fact that shield plate 66, which is solid throughout the transverse length of the roll, excludes air and traps moisture which is expelled from the paper as steam.

The concentricity of plate 66 with respect to roll 32 is very important in the production of formed paper of satisfactory and uniform quality. The plate is made of a strong webbed casting with an accurately machined inner curved surface and is provided with means at either end for accurately adjusting both its parallelism and clearance with respect to the surface of roll 32. The plate is attached at its far end (as viewed in Fig. 1) to a slide block 67 which is mounted in horizontal ways 68 and 69. These ways are attached to a plate 70 which slides between vertical ways 71 and 72. Plate 66 is adjusted vertically to bring it into concentricity with roll 32, by means of a pair of adjusting screws 73 and 74. A microscrew 75, threaded into block 67 and carried by an arm 76 which is attached to plate 70, provides for adjustment of the clearance between plate 66 and roll 32. The microscrew is operate by a handwheel 77 and the clearance may be checked by means of an indicator finger 78 mounted on block 67 in known relationship to the plate 66 some fixed point of the machine from which measurement of the travel of block 67 can be made. To prevent undue vertical movement of the plate 66 as the result of thermal expansion, an adjustable stop 79 (Fig. 6) bearing against the top of plate 66 is mounted on a cross-channel 80, secured to the frame of the machine, and is adjusted by means of a nut 81. The mounting of the other end of plate 66 (the near end as viewed in Fig. 1) is similar in all respects, so that the height and clearance can be adjusted at both ends to achieve perfect parallelism with roll 32 and uniform clearance across its entire surface.

It is important in the performance of the hot impression process by which the basic rigid type of paper is produced, to insure exact mesh and uniform clearance between the teeth of the impressing rolls. The surfaces of the rolls are, in effect, male and female dies between which the paper is molded. Due to the intricate shape and considerable depth of the pattern to which the roll surfaces are cut, small irregularities in the mesh and clearance will produce defects in the paper. Uniformity of production in the impressing stage is essential, not only when the paper is to be used in its basic rigid form, but also for the performance of the further operations by which the basic elastic and other types of paper are produced. This process differs materially from a typical embossing process in which the embossing rolls engage the paper with considerable pressure, but are spring-pressed so that they will yield to some extent under varying conditions. Embossed patterns, furthermore, are usually fairly shallow. In this process, the rolls are rigidly mounted, and the paper is fed to the impressing rolls under very light tension and is "gathered" in by the rolls, rather than stretched, to form the undulations. No substantial pressure is applied to the paper as it lies between mating surfaces of the teeth, and in fact the rolls are ordinarily set so that the clearance between the face of a tooth and the root surface with which it mates is slightly greater than the thickness of the paper. Too tight a mesh will result in nicks or cuts, especially at the vertices of the zigzags, and too loose a mesh will result in impressions of poorly defined shape, so that the paper will not react properly to the further processes by which the flexible and elastic types are produced. The clearance must therefore be accurately set for the type of paper to be processed and maintained constant within narrow limits during a production run. The thermal expansion of the rolls must also be taken into account.

The mounting arrangement which provides for accurate adjustment of the mesh of the impressing rolls is illustrated in Fig. 2. The upper roll 32 is secured to trunnions 85 and 86 which are mounted in bearings 87 and 88. The bearings are housed in bearing blocks 89 and 90, which are slidable in pairs of vertical ways 91 and 92, fixed to the frame 30 of the machine. The bearing blocks, shown in Fig. 2 without their covers, have removable covers exemplified by cover 90a in Fig. 1, so that the entire upper roll assembly, along with its bearings may be taken out, when necessary, to exchange the impressing rolls for rolls of a different pattern, for example. The bearing blocks 89 and 90 are secured to the frame by lock nuts 93 and 94. Bearing 88 is a thrust bearing of the taper roller type, while bearing 87 is of a type which permits axial motion, for example, a roller or cage type. Roll 32 is thus fixed axially at its right-hand end but is free to move axially toward the left-hand end to accommodate its thermal expansion at various operating temperatures.

The lower roll 33 is secured to trunnions 95 and 96 which are mounted in bearings 97 and 98 housed in bearing blocks 99 and 100. These blocks are also provided with removable covers, as exemplified by cover 100a in Fig. 1, so that the entire lower roll and bearing assembly may be removed in the same manner as the upper rolls.

Fixed to the lower ends of bearing blocks 99 and 100, which slide vertically in ways 91 and 92, are lead screws 101 and 102. These screws pass through internally threaded hand wheels 103 and 104 mounted on shoulders 105 and 106 of the frame of the machine. The hand wheels and lead screws provide fine independent vertical adjustment of either end of the lower roll 33, so that the roll may be brought to exact parallelism with the upper roll, and the clearance between rolls can be accurately controlled. The hand wheels can be locked in any desired position by means of wing nuts 107 and 108. The rotational speed of the rolls 32 and 33 is synchronized by meshing spur gears 109 and 110 of equal pitch, mounted on trunnions 86 and 96, respectively. These gears are of the long tooth type to permit vertical adjustment of the rolls, and gear 109 is driven in a manner to be further described.

To accommodate the transverse expansion of roll 33 at the relatively high operating temperatures employed, bearings 97 and 98 are both of a type which allows axial movement of the roll. The axial position of the right-hand roll is controlled by the following device: A disc 111 is fixed to the trunnion 96. An internally threaded hand wheel 112 is mounted on a bracket 113, fixed to the frame of the machine and drives a lead screw 114. The latter is attached to a fork 115 which slides transversely in guides 116 also mounted on bracket 113. The fork straddles disc 111 and carries a pair of rollers 117 and 118, which engage the disc between them. The right-hand end of roll 33 is thus fixed in any desired axial position by adjusting the position of fork 115. This device permits initial axial adjustment to obtain an accurate mesh in the transverse direction. Some axial adjustment of roll 33 may also be necessary from time to time to compensate for differences in expansion of the rolls due to differences in their temperatures.

The impressing rolls 32 and 33 are heated by means of tubular electrical heating elements 120 and 121 which, as indicated in Fig. 7, run transversely through suitable aligned holes in the pairs of rings 35 and 36 (or the corresponding rings of roll 33) which make up the toothed faces of the rolls. As shown in Fig. 6, a number of these elements are disposed concentrically, and evenly spaced, around the inner sleeves, exemplified by sleeve 34, to provide uniform heat distribution to the roll surfaces. The elements are placed fairly close to the toothed faces in order to minimize thermal lag in heating the faces. The heating elements 120 of the upper roll are supplied by leads 122 (Fig. 7), run in through trunnion 85 which is made partly hollow for this purpose. The leads are connected to a commutator 123 (Fig. 2), which is mounted on trunnion 85 and is supplied with power through its brushes in any conventional manner. The heating elements 121 of the lower roll are connected in a similar manner to a commutator 124 mounted on trunnion 95. If three-phase current is used for the power supply, it is preferable to connect to heater elements so that elements disposed in succession around a roller are connected to alternate phases. This prevents the occurrence of a large unheated area in, and consequent distortion or unequal expansion of, the rolls, in the event of unexpected breakage of a phase.

The control of the temperatures of the impressing rolls is another important factor in the production of these types of paper, and the heating system must accordingly meet certain requirements which are as follows:

(1) In order to produce a permanent impression the impressing rolls must be above a certain minimum temperature (regardless of speed) which varies for different types of materials. The heating system must be of adequate capacity to heat the rolls to the operating range of temperatures reasonably quickly and maintain their temperature at operating speed. It is also necessary to control the maximum temperature, according to the type of material processed, fairly accurately, as the temperatures normally employed are close to the maximum which the material will withstand.

(2) The speed of the rolls, or in other words, the length of time during which the paper remains in contact with the rolls, should be proportionately related to their temperature for uniform results. If the temperature falls below the proper value for the maximum operating speed, the speed of the rolls must be proportionately reduced.

(3) The temperature differential between the two rolls must be kept to a minimum, or within tolerable limits. More heat is dissipated from the upper roll, due to its longer contact with the paper, than from the lower roll, and this difference in heat loss varies according to the type of material which is being processed.

The electrical system for controlling the temperature and speed of the rolls is illustrated in Fig. 13. The maximum temperature of the rolls is controlled by a regulator generally indicated by the numeral 125. The operating parts of this regulator consist of a dial 126, an L-shaped lever 127 mounted on a pivot 128, which is mounted in any suitable manner so as to be adjustable sidewise with respect to the dial, and a pointer 129 mounted on an armature 130 which rotates in the field of a magnet 131. Lever 127 is normally held in the position shown by a compression spring 132 and, in this position, engages a contact 133. A number of thermocouples connected in parallel, schematically represented by the thermocouple 134, are mounted close to the lower roll 33. Preferably a thermocouple 134, protected by a suitable sheath, is mounted to project into each of the grooves 56 of the lower roll, as schematically indicated in Fig. 6 to provide continuous and accurate detection of fluctuations in the temperature over the entire roll surface. At the start of a production run thermocouples 134 are connected to the coil of armature 130. The lever 127 is adjusted with respect to the dial 126 at the reading indicating the maximum temperature desired for a particular operation at the maximum operating speed of the rolls. As the roll 33 heats up, the current from thermocoupules 134 causes the armature to turn, carrying pointer 129 to the right. When the maximum temperature is reached, pointer 129 engages lever 127, and if the temperature continues to rise, the pointer will swing the lever counterclockwise, breaking contact 133. This contact is connected in the circuit of the coil of a relay 135 which controls three sets of normally open contacts 136. The heater elements 121 of the lower roll, here illustrated schematically, are wired to the power lines 137 through contacts 136. Relay 135 is normally energized, through main switch 137, when the machine is in operation and the temperature of roll 33 is below the maximum, and holds contacts 136 closed. When the maximum temperature for roll 33 is exceeded, the relay drops out, due to the opening of contact 133, as just described, shutting off the heaters 121. As the roll cools, the current from thermocouples 134 drops and pointer 129 moves back to the left, allowing lever 127 to return to its normal position. The circuit through contact 133 is thus restored as soon as the roll cools below the maximum temperature.

The differential between the temperatures of the upper and lower rolls is controlled by a second heat regulator, generally indicated by the numeral 139, which consists of a mercury switch 140, mounted to tilt to the left or right and carrying a pair of spaced pointers 141 and 142 which may be adjusted toward and away from each other, a dial 143, and a pointer 144 carried by an armature 145 which rotates in the field of magnet 146. The mercury switch normally is level and engages two contacts, a right contact 147, which is wired in the energizing circuit of relay 135, and a left contact 148. The latter contact is wired in the energizing circuit of the coil of a second relay 149 which controls three sets of normally open contacts 150, and which is normally energized when the main switch is closed, so as to hold contacts 150 closed. The heater elements 120 of the upper roll are connected to the line through contacts 150. A bank of thermocouples 151 are mounted to run in the grooves 46 of the upper roll (Fig. 7) and a second bank of thermocouples 152 is mounted to run in the grooves 56 of the lower roll.

The dial 143 is marked zero in the middle and calibrated in degrees, indicating the differential in the roll temperatures, to either side of the zero line. A plus differential, shown on the left-hand scale of the dial, indicates that the upper roll is hotter than the lower, and a minus differential, shown on the right-hand scale of the dial, indicates that the upper roll is cooler than the lower roll. The two banks of thermocouples 151 and 152 are connected to oppose each other in the polarity indicated on the drawing, and are wired to the coil of armature 145.

The pointers 141 and 142 are set on the dial at points corresponding to the desired maximum negative and positive temperature differentials. When the two rolls are at the same temperature the voltages of thermocouples 60 and 61 balance, so that no current flows across armature 145, and pointer 144 stays at the zero mark on dial 143. As the upper roll becomes hotter than the lower roll, current flows through armature 145 in such a direction as to move pointer 144 to the left. When the positive differential exceeds the value for which pointer 141 is set, pointer 144 engages pointer 141 and tilts the mercury switch 140 clockwise, breaking contact 148. Relay 149 then drops out, opening the contacts 150 and thus breaking the circuits to the heaters 120. These heaters remain deenergized until the upper roll cools sufficiently to allow pointer 144 to swing back (due to the reduction in potential of thermocouples 151) out of engagement with pointer 141. When the lower roll becomes hotter than the upper, current flows in the opposite direction through armature 145, due to the higher potential of thermocouples 152, and pointer 144 moves to the right until it engages pointer 142, tilting switch 140 counterclockwise, and opening contact 147. Relay 135 is then deenergized, and contacts 136 open, breaking the circuits to the heaters 121. The lower roll then starts to cool, and when its temperature drops sufficiently to allow pointer 144 to disengage from pointer 142, switch 140 returns to its normal position, closing contact 147 and restoring the circuit through relay 135, assuming, of course, that contact 133 is closed. The regulator 139 which controls the temperature differential also cooperates with regulator 125 to prevent the upper roll from overheating. If contact 133 opens, due to the fact that the temperature of the lower roll exceeds the value for which lever 127 is set, the lower roll cools and a positive differential is established, causing pointer 144 to move into engagement with pointer 141 and open the contact 148, breaking the circuit through relay 149 and thus shutting off the current through heaters 120 of the upper roll.

By means of the control devices just described the temperatures of the two rolls can be maintained constant and substantially uniform during a production run. The control of the temperature differential is of particular importance, as the upper roll, due to its prolonged contact with the paper, dissipates heat at a higher rate than the lower roll, and consequently the rolls tend very quickly to assume different temperatures. In order to compensate roughly for the difference in the rates of heat dissipation of the rolls, the total wattage of heaters 120 of the upper roll is somewhat higher than that of heaters 121. As an example for a pair of steel rolls approximately 1 foot in diameter and 40 inches wide, thirty-six 1100 watt heaters for the upper roll and the same number of 600 watt heaters for the lower roll have been found satisfactory. A fixed differential in the heat supply, however, will not entirely solve the problem, as the difference in the rates of heat dissipation of the two rolls varies according to a number of conditions, such as the weight, moisture content, and initial temperature of the paper, as well as the speed at which it passes through the rolls.

It sometimes happens, for example, when a heater element is burned out, or the paper is unusually cold or damp, that the impressing rolls cannot be maintained at the proper temperature for processing the paper at maximum speed. In this case it is necessary to reduce the speed of the rolls, in order to obtain a satisfactory impression at lower temperature. Also, when the machine has been shut down, a preheating period of half an hour to an hour may be required to heat the rolls, which are of substantial size, to their operating temperature for maximum speed production. In order to avoid loss of productive time, it may be desirable to start production during the preheating period. This can be done by starting production at slow speed, as soon as the rolls have reached the minimum temperature at which a satisfactory impression can be made on the particular type of paper to be processed, and gradually increasing the speed as the temperature of the rolls rises to the maximum. The machine is accordingly provided with a control system for regulating the speed of rolls 32 and 33. This system is also illustrated in Fig. 13.

A small roller 153, having a toothed surface cut to mesh with the toothed faces of one of the impressing rolls, is mounted in any convenient manner to mesh with one of the rolls, for example, the lower roll 33, and runs idle. This roller is preferably made as small as possible to minimize thermal lag. The bulb of a mercury thermometer 154 is inserted in this roller, and the capillary tube 154a of the thermometer is connected to a chamber 155 in a small hydraulic cylinder 156. Changes in the length of the mercury column will cause motion of a piston 157 to which a piston rod 158 is connected. This rod is of adjustable length, for example the rod may be made in two pieces secured together by a coupling 159. Rod 158 is connected through a pair of links 160 and 161 to a cam 162, pivoted at 163, which engages the control lever 164 of the governor 165 of a variable speed drive unit of conventional type. This drive unit drives the impressing rolls, as well as other operating mechanisms of the machine, as will be further described. The length of rod 158 is adjusted so that lever 164 is in its maximum speed position when the temperature of roll 33 is at the maximum selected for the particular type of paper being processed. When the temperature of roll 33 falls below the maximum, lever 164 will be moved clockwise (as seen in Fig. 13) by the mechanism just described, this direction being made to correspond to the direction for reduction of the speed of the drive unit. The speed of the impressing rolls is thus automatically reduced as the temperature of the rolls drops and increased as their temperature rises. The total heat imparted to the paper during its passage through the impressing rolls is thus maintained approximately constant throughout a production run, so that a uniform impression is obtained.

As shown in Figs. 6 and 11, a number of stripper fingers 170, very similar to stripper fingers 5, are mounted to run in the grooves 46 of the upper rolls. Fingers 170 are mounted on a base plate 171 and secured by a plate 172 which is suitably slotted to receive their left-hand ends. Plate 171 is fixed at the far end (as viewed here) to a slide block 173 which slides in horizontal ways 174 and 175, secured to a plate 176. The latter is mounted in any suitable manner to slide horizontally on the frame of the machine and is moved by means of a rack 177 and pinion 178 driven by a suitable hand crank (not shown). Plate 176 can be completely removed from the machine by turning pinion 178, to allow access to the upper roll and other parts of the machine. With plate 176 in its normal position, fine adjustment of fingers 170 in the horizontal direction may be made by means of a screw 179 which is threaded into block 173. A certain amount of vertical play is provided in ways 174 and 175, so that small vertical adjustments may be made in the position of the stripper fingers 170 by means of screws 180 which bear on the bottom of block 173 and are locked by nuts 181. The mounting arrangement for plate 171 is duplicated on the near side of the machine.

The parts so far described make up the mechanism for providing the basic rigid type of paper. If the paper is to be used in this rigid form, it may be carried directly from roll 32 to a suitable winding mechanism for winding it into rolls, or to cutting devices of any conventional type for cutting it into sheets of the desired size.

To convert the basic rigid type of paper to the basic elastic type, a braking roll 185, shown in Figs. 1 and 6, is brought into contact with the paper as it leaves the upper impressing roll 32. Roll 185 is supported at the far end by a lever 186 which is journalled on a fixed shaft 187 mounted on the frame of the machine. A tension spring 188 is connected to the right-hand end of lever 186 and is anchored to a cross bar 189 on the frame of the machine. A lever 190, pivoted on cross-bar 189, is connected to lever 186 through a two-piece link 191, the length of which is adjustable by means of a threaded coupling sleeve 192. A cam 193, operated by a handle 194 is arranged to engage the upper end of link 191 to push the right-hand end of lever 190 downward to raise roll 185. The vertical position of the roll with respect to the paper is regulated by means of this cam and, in its extreme downward position, the cam raises roll 185 out of contact with the paper when it is desired to have the roll out of operation, as in making the basic rigid type of paper. The pressure of roll 185 on the paper is regulated by a screw 195 and nut 196, by which the tension on spring 188 can be adjusted. The near end of roll 185 is suspended on a structure which is a duplicate of that just described.

To maintain uniform pressure throughout the length of roll 185, a pair of rollers 197, mounted on a suitable yoke 198, bear on the central part of roll 185. Yoke 198 is suspended at both ends by levers, for example lever 199, which are journalled on shaft 187 with control devices which are similar in every respect to the arrangement of links 190 and 192, spring 188 and cam 194 with respect to lever 186. Handle 195 is attached to all four cams and operates simultaneously on all four of the suspension levers, that is, levers 186 and 199, and their duplicates, to raise and lower rollers 197 along with roll 185.

Mounted on shield plate 66 is a guide plate 200, which carries a number of comb-like teeth which project under the right half of roll 185. This guide has a shoulder 202, which follows the curvature of roll 32 for a short distance downward. Guide 200 is resiliently mounted on plate 66 by means of a number of spring loading devices, exemplified in Fig. 11 by a stud 203 threaded into plate 66, a coil spring 204 coiled around the stud and bearing on a slidable collar 205, and a pair of lock nuts 206 which secure the upper end of the spring. Guide 200 can be lifted up out of contact with the paper by means of a series of rocker arms 207 which are connected to lugs 208 disposed at intervals along the guide and are pivoted on brackets 209 on plate 66. Arms 207 carry roller followers 210 which engage a series of cams 211 keyed to a shaft 212 which runs across the machine and is turned by a handle (not shown). The guide 200 is raised out of operation by turning cams 211 a quarter turn clockwise.

Immediately to the left of roll 185 is a second guide plate 213 having a flat horizontal under surface 213a which is parallel to the upper surface 172a of plate 172. Guide 213 carries a number of comb-like teeth 214 which pass under the left half of roll 185 and line up with teeth 201 of plate 200. Plate 213 is suspended by means of a lug 215 to which is connected a rod 28. The latter is threaded into a ring yoke 217 which is rotatably suspended on an eccentric cam 218. A second similar suspension assembly is provided at the near end of plate 213, and both eccentrics are keyed to a shaft 219 which may be turned by the handle 220 to raise and lower plate 213.

As shown in Fig. 12, roll 185 carries a number of knurled rings 221 which project downward through the openings 222 formed by the spaces between the teeth 201 and 214 of guides 200 and 213, respectively. These rings bear on the paper when roll 185 is in operating position, and produce the braking action by which the basic rigid type of paper is converted into the basic elastic type.

The action of the braking roll 185 and the associated guides on the paper is schematically illustrated in Fig. 11 and is described as follows:

The paper, immediately after it is disengaged from the teeth of the upper impresisng roll 32, is confined in the vertical direction between what are, in effect, two substantially continuous horizontal parallel guide surfaces made up of the upper surfaces of stripper fingers 170 and the under surfaces of the teeth 201. The pressure of the knurled rings 221 on the peaks of the undulations which have been impressed in the paper, brakes the forward motion of the paper as it passes under the center of roll 185. At the same time the new paper emerging from roll 32, being substantially rigid in the longitudinal direction, exerts a longitudinal thrust on the paper which lies between teeth 201 and fingers 170, causing the paper in this region to "break" along the natural top and bottom fold lines (which correspond in position, with respect to the zigzag impressions, to the imaginary lines 47 and 50 shown in Fig. 8). The pleats which are characteristic of the basic elastic type of paper are thus formed, and the rows of undulations are also brought closer together, so that the paper becomes both flexible and elastic in the longitudinal direction. The total height of the paper is also somewhat increased by the pleating operation. The accumulation of paper which is being constantly built up in the region between fingers 170 and teeth 201 is constantly pushed forward by the thrust of the rigid paper emerging from roll 32, and paper which has been converted to the elastic type is continuously forced forward past roll 185 in spite of the pressure of the latter. The pleats of the paper thus produced are of average tightness, and the paper emerging from roll 185 is referred to as the "normal" elastic type. This type of paper is one of the commonly used finished products which the machine is adapted to produce. When this type is desired, the paper may be fed directly to winding or cutting apparatus, after leaving roll 185.

The function of the shoulder 202 is to prevent the paper accumulating between fingers 170 and teeth 201 from backing up into the impressing roll 32. This shoulder follows the curvature of the impressing roll and extends down a short distance below teeth 201. Due to the slight increase in height of the paper resulting from the pleating process, the paper to the left of this shoulder will not pass back, while the rigid paper emerging from the impressing roll will pass freely forward. A wrinkle or irregular formation may occasionally occur in the production of the basic rigid paper, because of faulty feeding. The spring mounting of the guide 200 permits the guide to ride up to allow an unusually thick piece of paper to pass through so that the machine does not become jammed. If the thickness of the irregularity is too large to be accommodated by the resilient mounting of guide 200, the guide may be manually raised by turning the handle which operates cams 211 to free the machine.

When a paper of the type referred to as "tight" elastic, in which the pleats are brought very close together in the longitudinal direction, is desired, a second longitudinal pressing operation is performed by means of a second braking roll 225 in cooperation with plates 172 and 213. Roll 225 is rotatably mounted on end arms, one of which, arm 226, is illustrated in Fig. 6. Rod 226 is adjustably mounted on a rocker arm 227 which is journalled on a shaft 228 fixed to the frame of the machine. An eccentric cam 229, fixed to a shaft 230 operated by a handle 231, bears on the upper part of rocker arm 227. The roll 225 may thus be raised and lowered by means of the handle, it being understood that shaft 230 also operates a similar suspension for the near end of the roll. A rod 232 is attached to arm 226 and connected to a tension spring 233. The latter is anchored to the frame of the machine by an adjusting screw 234 so that the pressure of the roll may be varied. A similar spring assembly is provided at the near end of the roll. The position of roll 225 can be varied by adjusting the length of the lever arm, made up of rod 226 and arm 227 (and the equivalent assembly at the near end of the roll).

The pressure of roll 225 produces a braking action on the paper advancing between plates 172 and 213 and compresses the pleats more tightly together in the longitudinal direction, the degree of tightness depending on the pressure of roll 225. In its tightened form, the product generally referred to as the "tight" elastic type, the successive pleats of the paper touch each other and the zigzag undulations which have been brought into almost vertical position, nest with each other. Plate 213 can be moved up and down by means of eccentrics 218, as previously described, and is preferably adjusted, during this operation, to allow a small clearance for the paper emerging from roll 185, to accommodate the increase in height resulting from further longitudinal compression. The tight elastic type of paper has certain advantages over the normal elastic type, as it occupies less space for shipping and storage and can be subsequently stretched to any degree desired for wrapping various articles.

Elastic paper of an intermediate degree of tightness, which cannot be readily obtained by varying the pressures and adjustments of rolls 185 and 225, is sometimes desired. Also certain papers retain the pleated effect better if they are first pleated tightly, and then stretched to the desired finished tightness, or weight per unit area. For this purpose, a pair of drawing rolls 235 and 236 is provided. Roll 235 is mounted in fixed bearings on the frame of the machine and runs idle. Roll 236 is rubber covered, and is positively driven at a peripheral speed higher than the speed of feed of the paper. This roll is mounted at either end on suspension arms 237, one of which is shown in Fig. 6, journalled on a shaft 238. The weight of roll 236 produces enough friction to draw the paper at the speed desired. It is also possible to adjust the pressure of roll 236 on the paper by means of adjusting screws 239, mounted on the frame of the machine and bearing on the ends of levers 237. To raise roll 236 out of contact with the paper, a handle 240, fixed to a shaft 241 carrying cams 242, may be turned to bring the cams to bear on levers 237. Roll 236 is driven at a speed proportionate to that of the impressing rolls, as will be further described, at a suitable ratio to produce the desired amount of longitudinal stretch in the paper.

The braking rolls 185 and 225, with their associated plates and guides, and drawing rolls 235 and 236, make up the mechanism by which the paper is processed to impart various degrees of flexibility and elasticity in the longitudinal directions. The elastic products thus produced are all quite rigid in the transverse direction, in fact the tighter forms have somewhat greater transverse rigidity than the original basic rigid type of paper from which they are made.

For many uses it is desirable to impart a certain amount of flexibility, or both flexibility and elasticity, to the paper in the transverse direction. The machine is provided with various mechanisms for performing such operations. One of these mechanisms consists of a pair of crushing rolls 245 and 256 which are mounted transversely across the left-hand end of the machine as viewed in Fig. 6. These rolls are illustrated in more detail in Fig. 3. These rolls are made up of inner sleeves 247 and 248 on which are mounted outer sleeves 249 and 250, respectively. The surfaces of the outer sleeves are formed with circumferential ribs 249a and 250a which are generally V-shaped but have flattened, knurled peak surfaces 249b and 250b, respectively. The rolls, as seen transversely, have a saw tooth configuration, and the peak surfaces of the upper and lower rolls are staggered. The peak surfaces of the rolls are spaced to correspond to alternate vertices of the zigzag impressions on the top and bottom of the sheet. These rolls are used primarily on the elastic type of paper. As the braking action of roll 185 imparts a slight backward slant to the pleats of the elastic type, the surfaces 249b are preferably spaced to correspond to the rear vertices of the peaks of undulations on the top of the sheet (as it emerges from the impressing rolls), and the surfaces 250b are spaced to correspond to the front vertices of the peaks of the undulations appearing on the bottom of the sheet. Assuming, for example, that Fig. 8 illustrates a part of the surface of roll 32 which is travelling upward, surface 249b would be spaced to correspond to grooves 46, and surfaces 250b would be spaced to correspond to the mating flat faces of each pair of rings 35 and 36.

Roll 246 is mounted on trunnions 251 running in bearings 252 which are fixed on the frame of the machine. Roll 245 is mounted on trunnions 253 running in bearings 254 which are slidably mounted in pairs of vertical ways 255 on the frame of the machine. The vertical position of roll 245, and thus the spacing or bite of the roll, is adjusted by means of a pair of lead screws 256 operated through suitable bevel gears (not shown) by a cross shaft 257 and hand wheel 258. The rolls 245 and 246 are heated, in much the same manner as the impressing rolls, by a number of electric heater elements 259 and 260, connected to commutators 261 and 262. As rolls 245 and 246 dissipate heat at about the same rate, their temperature may be automatically maintained within minimum and maximum limits controlled by thermostatic controls of generally conventional design. These rolls are ordinarily operated at temperatures in the region of 100° C., and are synchronously driven at a speed equal to the speed of feed of the paper.

Fig. 1 illustrates a modified form of mounting of rolls 245 and 246 which permits easier access to the machine. The rolls are mounted at one end on bearings 263 and 264, through which a lead screw 265 is threaded and which are slidably mounted in a slotted guide post 266. The lead screw is threaded right hand for the upper roll and left hand for the lower roll and is driven through bevel gears by an independent reversible motor 267. A similar adjusting device, operated by motor 267, is provided at the other end of the rolls. Suitable stops may be provided to limit the travel of the rolls, and fine adjustment of their bite is made by means of a hand wheel 268 connected to screw 265 through bevel gears 269.

For aligning the paper as it enters the crushing rolls so that the knurled surfaces 245b and 246b line up correctly with the vertices of the zigzag undulations, a guide, generally indicated by the numeral 270 in Fig. 1, is provided. As shown in Fig. 4, this guide consists of a plate 271 on which are mounted a pair of angular side bars 272 and 273. These bars are secured by screws 274 and 275 to plate 271 which is slotted to allow movement of bars 272 and 273 for adjusting the width of the guide. The plate 271 is mounted to slide transversely on brackets 276 and 277 which are provided with transverse ways 278 and 279. The brackets are mounted on the frame of the machine. The transverse position of the guide as a whole is adjusted by means of screw 280, so that the paper can be accurately aligned with the knurled surfaces 249b and 250b as it enters the crushing rolls.

The finished products obtained by running the basic elastic type of paper, of various degrees of tightness, through the crushing rolls, as just described, may be taken off directly to a winder. These products retain their initial flexibility and elasticity in the longitudinal direction and are moderately flexible in the transverse direction. Tight elastic paper, after passing through the crushing rolls, may be run through the drawing rolls 235 and 236 to obtain a product of lighter weight per unit area. The degree of flexibility produced can be varied to some extent by varying the spacing of the crushing rolls to produce crushed lines of greater or lesser depth. The vertical spacing between the roll surfaces is ordinarily about equal to the overall thickness of the elastic paper. It is understood that the shape and dimension of surfaces 249b and 250b may be varied. For example, these surfaces may be made broader to produce a more pronounced crushing effect between their edges and the sloping sides of the opposite ribs.

For certain purposes it is desirable to impart transverse elasticity, or extensibility, to papers of the various types so far described. This process is performed by a mechanism referred to in the introduction as the "cross-pressing" mechanism. As a preparatory step, before cross-pressing, certain types of paper are passed between a pair of grooving or scoring rolls 281 and 282. These rolls are mounted, as illustrated in Fig. 1, transversely on a pair of brackets 283 on the frame of the machine, and are illustrated in detail in Fig. 5. Rolls 281 and 282 run in pairs of flanged bearings 284 and 285, respectively, mounted on brackets 283. Bearings 285 are fixed and bearings 284 float in slots 286. The spacing and parallelism of the rolls is adjusted by means of a pair of screws 287 which engage bearings 284. Rolls 281 and 282 are made up of inner sleeves 288 and 289, carrying a number of circumferential equally spaced fins 290 and 291 held in place by spacer rings 292 and 293, respectively. These fins are spaced to correspond to alternate vertices of the zigzag impressions on the top and bottom surfaces of the paper. As previously explained with respect to the crushing rolls, it is preferable, due to the initial slant of the pleats, to score the paper along the rear vertices of the zigzags on the top surface of the paper (as it appears when emerging from the impressing rolls) and along the forward vertices of the zigzags of the impressions on the bottom surface. In the arrangement here shown, the paper travels around roll 235, which serves merely as an idler guide when roll 236 is out of action, before reaching rolls 281 and 282. The top and bottom surfaces of the paper are thus reversed in position when the paper reaches the scoring rolls. The fins 290 of roll 281 are accordingly aligned to strike the forward vertices of the zigzags, and fins 291 of roll 282 are aligned to strike the rear vertices.

The fins 290 and 291 are relatively narrow, as compared to the knurled surfaces of the crushing rolls, so as to produce rather sharply defined score lines along the vertices to facilitate the bending of the paper in these regions during the cross-pressing process. Rolls 281 and 282 are synchronously driven at a peripheral speed equal to the speed of travel of the paper. The scoring rolls are used primarily for preparing fairly tight elastic types of paper for cross-pressing. To guide the paper in the transverse direction so as to align the zigzag vertices accurately with the fins, a guide, indicated as a whole by the numeral 294 in Fig. 1, is provided. This guide is similar in every respect to the guide illustrated in Fig. 4 and previously described.

The cross-pressing mechanism, indicated as a whole in Fig. 1 by numeral 295, is illustrated in detail in Figs. 14–21. The operating parts of the cross-presser are mounted on a frame generally indicated by the numeral 296. It is understood that this frame and frame 30 are mounted on a fixed base and properly aligned so that the paper can travel in a continuous path through the machine. A pair of endless conveyors 297 and 298 are mounted on this frame and are continuously driven in the direction indicated by the arrows in Fig. 14 by an independent variable speed drive, through four pairs of sprockets 299 and 300. These conveyors are mounted parallel, one above the other so as to carry the sheet of paper forward between their adjoining straight portions. As shown in Fig. 16, the upper conveyor is made up of links in the form of long flat cross-bars 301 placed close together, side by side so as to form a substantial continuous plane surface in the straight portions of the conveyor path. These links have T-shaped ends 301a, forming between them the openings 302 in which the teeth of the sprockets 299 engage. The extreme ends of the bars, during their travel along the straight portions of the path of conveyor 297, slide between upper and lower pairs of channel shaped horizontal guides 303 (Figs. 17, 18 and 19) mounted on the frame of the machine. As shown in Fig. 15, over the curved portions of the path, where the links are in contact with the sprocket teeth, the ends of the links ride in curved guides 304 which have somewhat wider slots than the straight guides to permit the links to turn. The lower conveyor 298 is made up of links 305 which are very similar to links 301, and the ends of which ride in straight guides 306 similar to guides 303, and curved guides 307 similar to guides 304. The paper is thus confined in the vertical direction, as it passes between the conveyors, by two substantially continuous flat surfaces.

Mounted in transverse slots 308 and 309, cut in each link 301 near its ends, are a number of flat-sided sliding pins 310 and 311. These pins carry rollers 312 and 313, respectively, mounted on ball bearings on their upper ends, and have small plates 314 and 315 welded to their lower ends, below links 301, as seen in Fig. 19. As shown in Figs. 20 and 21, each of the pins 310 is slidably mounted on a guide rod 316 which is secured to each link 301 across the slot 308. A coil spring 317 wound around rod 316 urges pin 310 toward the outer end of the slot. The inner ends of rods 316 are secured by screws 318. These rods assist in holding the presser plates parallel to the links. Rollers 312 are secured to pins 310 by means of screw caps 319 which may be removed to permit removal of plates 314 from links 301. The mounting of pins 311 and rollers 313 is similar. The sliding pin and plate assemblies just described constitute individual transversely movable cross-pressing elements which engage the longitudinal edges of the paper as it travels between the conveyors.

The plates 314 and 315 travel gradually toward each other as they pass along the lower straight part of the path of conveyor 297, thus progressively compressing the paper between them in the transverse direction. This motion is brought about by a pair of converging guides 320 and 321 along which the rollers 312 and 313 run, as the links 301 move from the feed end to the discharge end of the mechanism (that is the left-hand end and right-hand end, respectively, as viewed in Fig. 1). Guides 320 and 321 are mounted on a plate 322. At the feed end, the entering pair of plates 314 and 315 are spaced so that their inner end surfaces 314a and 315a are spaced apart by a distance equal to, or somewhat greater than, the width of the entering paper. On reaching the discharge end of the conveyors, the end surfaces of each pair of plates are spaced apart by a lesser distance corresponding to the degree of cross-pressing desired. This distance may be somewhat less than the finished width of the paper, as the paper tends to spring back to some extent when the transverse pressure is removed.

The extent to which the paper will yield to transverse pressure in the cross-pressing process varies according to the type, as well as the characteristics of the original sheet material. For example, elastic papers which have been run through the crushing rolls can be compressed by only about 20% of their original width, whereas the basic rigid type can be compressed to about 50% of their original width. In order to obtain various degrees of cross-pressing, provision is made for adjusting the convergence of guides 320 and 321. On their left-hand ends, as viewed in Fig. 16, the guides carry pins 323 and 324, which are rotatably mounted in brackets 325 and 326 secured to plate 322. On their right-hand ends the guides carry rollers 327 and 328 which slide in curved slots 329 and 330 of the brackets 331 and 332 which are also fixed to plate 322. A lead screw 333, having right hand threads on one end and left hand threads on the other, runs through a pair of two-piece swivel brackets 334 and 335, connected to guides 320 and 321. Screw 333 may be turned by means of hand wheels 336 and 337, at either side of the machine, to adjust the angle of both guides 320 and 321 simultaneously. It will be noted in Figs. 16 and 21 that the inner end surfaces 314a and 315a of the cross-pressing plates are slanted approximately parallel to the guides 320 and 321. The resulting overall profile, composed of the inner surfaces of the plates, in contact with the edge of the paper follows the general slope of the guides, while the slight saw-tooth effect produced by the projecting forward corners of the plates assists in feeding the paper through the conveyors.

Because of the increase in height of the paper resulting from cross-pressing, as well as the tendency of the sheet to buckle, the links of the conveyors are subject to considerable upward and downward pressure during their contact with the paper. Because of the rather substantial width of the apparatus, deformation of the links is likely to occur. To reinforce the links a pair of heavy backing plates 322 and 338 are mounted above and below the working regions of the upper and lower conveyors, respectively. These plates may be heated by any suitable means (not shown) to serve as heaters for the paper, especially for processing papers which do not "hold the fold" well. For the most part, however, the residual heat of the paper as it comes from the impressing rolls is sufficient for the cross-pressing process, and on many types of paper the process can be performed cold.

The lower backing plate 338 is rigidly mounted on the frame 296 by means of pairs of brackets 339 and 340. The plate is mounted immediately below the links 305, in the working region of conveyor 298, and its upper surface is highly polished so that the links will slide readily over it.

The upper plate 322, which carries guides 320 and 321 as previously described, is suspended, by pairs of lugs 341 and 342, from two cross-shafts 343 and 344. As shown in Fig. 18, one end of shaft 343 carries a collar 345 to which is attached a screw 346. The latter is engaged by a threaded handwheel 347 mounted on a bracket 348 on frame 296. Side sway of the plate is prevented by a T-block 349 running in vertical ways 350. This suspension is duplicated at the other end of shaft 343 and at both ends of shaft 344, so that the plate 333 can be levelled and adjusted up and down by the handwheels at all four corners. The plate 322 is trapezoidal in plan, and dimensioned to fit between the rollers 312 and 313 when guides 320 and 321 are at their position of maximum convergence.

To assure the return of the cross-pressing plates 314 and 315 to the original, or "open" position after they pass the discharge end of the machine, a pair of deflector bars 351 and 352, the ends of which are shown in Fig. 17, are mounted immediately under the upper straight portion (or return portion) of the path of conveyor 297. These bars are rigidly supported in any suitable manner from the frame 296, and their outer edges are parallel to the inner edges of guides 320 and 321 in their position of maximum convergence, and are placed so as to engage the inner side of the roller of a jammed plate as it comes out of the working region of the conveyor. In case of failure of the return spring of one of the cross-pressing plate assemblies, the roller of the defective assembly will thus be engaged by one of the deflector bars, and returned to the proper starting position by the time it reaches the feed end of the conveyor.

To adapt the machine for papers of various thicknesses, the lower set of straight guides 303 of the upper conveyor are vertically adjustable. These guides carry threaded pins 353 running through short vertical slots 354 in the frame of the machine and locked in place by nuts 355. A number of these pins are provided at intervals along these guides. As shown in Fig. 15 these guides have widened bevelled run-in portions where they join the curved guides at the ends of the machine, to permit this adjustment. The vertical adjustment necessary for varying the spacing between the conveyors is relatively small, on the order of 2 mm. These adjusting devices also permit the upper conveyor to be set to diverge slightly from the lower conveyor, toward the discharge end of cross-pressing mechanism, to accommodate the slight increase in overall thickness of the paper resulting from the cross-pressing process. This divergence is ordinarily on the order of 1 mm. The position of the upper backing plate is correspondingly adjusted by means of handwheels 347, as previously described. It may be necessary, in changing from one thickness of paper to another to exchange the entire set of presser plates 314 and 315, for a set of different thickness. For this purpose, the presser plate assemblies can be readily removed by removing the caps 319 to free the rollers 312 from the pins 310 (Fig. 20) and loosening screws 318 to remove guide rods 316.

Figs. 22 and 23 illustrate a modification of the cross-pressing mechanism. In this modification, a set of presser plates 360 having transverse slots 361, slide on key blocks 362 secured to the links 305 of the lower conveyor. The links 301 of the upper conveyor are suitably hollowed out on the under side to accommodate the upper parts of blocks 362. The outer ends of the plates 360 extend outward beyond the ends of the conveyor links and carry end caps 363. A chain 364, of the roller link type, passes around three sprockets 365, 366 and 367 and carries shoes 368 which, in the sloping part of the chain travel, bear against end caps 363 of the presser plates.

A guide bar 369 is pivoted on the shaft of sprocket 365 and is slotted at the right-hand end for adjustment with respect to sprocket 366. It is understood that the chain, sprocket, and guide bar assembly as a whole may be mounted on a suitable movable frame 370, which can be rotated around a point concentric with shaft 371 by means of an adjusting mechanism similar to that which adjusts the convergence of guides 320 and 321 in Fig. 16. Chain 364 is driven at the same speed as the conveyors, which in this case are driven through chains 372 and 373. It is understood that the plates on the opposite side of the conveyors are similarly mounted and guided. One advantage of this arrangement is that it permits the use of conveyors which are somewhat narrower than those shown in Fig. 16, thus reducing the length of the links. The chain 364 also reduces the friction of the presser plates as they advance against the guides and are subjected to the rather substantial transverse force resulting from the resistance of the paper to cross-pressing.

The drive for the entire machine is schematically illustrated in Fig. 10. The main drive for the mechanisms mounted on frame 30 consists of a variable speed drive 164, of conventional type, from which the power is taken off through a V-belt 371 and pulleys 372 and 373. Mounted on the shaft 374 is a gear 375 which, through a set of reduction gears 376 and 377, drives the gear 109 of the upper impressing roll. A sprocket 378, mounted on the shaft 86 of the upper impressing roll drives a chain 379 and sprocket 380, by means of which the gears 381 and 382 of the crushing rolls 245 and 246 are driven.

A sprocket 383 mounted on shaft 374 drives a chain 384 and sprocket 385 which operates a variable speed transmission 386, by which the drawing roll 235 is driven through a series of chain and sprocket drives 387 and 388. The sprocket 391, on the shaft of scoring roll 282 drives this roll, and also roll 281 through a pair of gears 389 and 390. Sprocket 391 is driven from the variable speed transmission 386 through chain and sprocket drives 392 and 393 and gears 394 and 395. The drives to the drawing roll 235 and scoring rolls 281 and 282 are provided with clutches 396 and 397. The drawing roll, when in operation, is driven at a peripheral speed faster than the speed of feed of the paper through the impressing rolls, at a ratio to produce the desired amount of stretch, this ratio being adjusted by means of the variable speed transmission. The scoring rolls, if used, must also be driven at the peripheral speed of the drawing roll. This is accomplished by driving both mechanisms from the same transmission. When the scoring rolls are used with the drawing roll out of operation, transmission 386 is set to run the scoring rolls at a peripheral speed equal to the speed of feed through the impressing rolls.

For convenience in taking off the types of paper which are not to be cross-pressed to a winder, a conveyor consisting of a number of idler rollers 398 and driven rollers 399 is mounted above the cross-presser. Rollers 399 are driven by the variable speed transmission through gears 394 and 395 and a series of chain and sprocket drives 400. A pair of slitter rolls 445 (Fig. 1) may also be driven from the shaft of the last driven roller 399 by means of a drive system generally indicated by the numeral 402.

The cross-presser is powered by a second variable speed drive 405. An independent drive for this mechanism is provided both because of the substantial power requirement and because of the difficulty in achieving directly the proper synchronization of its feed speed with that of the previous mechanisms, due both to the rather unpredictable effect of the cross-pressing on the length of the sheet and the necessity for slack feeding of the elastic types of paper. The sprockets of the cross-presser are driven through a V-belt and pulley drive 406, a pair of worms 407 and worm gears 408, and sets of gears 409 at either end of the machine, the gear ratios being suitable to drive the conveyors 297 and 298 at the same peripheral speed.

To coordinate the speed of the cross-presser with that of the previous mechanisms, a rocker arm 410 (Fig. 1) is rotatably mounted with its fulcrum at 411 on frame 30, and is balanced by means of an adjustable counterweight 412 and equipped with a dash pot 412a. A lever 413 connected to the rocker arm and to the control lever 414 or the variable speed drive 405 in such a manner as to increase the speed of the latter as the rocker arm rotates clockwise.

Before entering the cross-presser, the paper falls down on to rocker arm 410, after passing either over the first of the driven rolls 399, or through the scoring rolls 281 and 282. As the amount of slack paper lying on arm 410 increases, its weight tends to rotate the arm clockwise, thus speeding up drive 405. As the amount of slack decreases the arm rotates in the other direction, slowing down drive 405. The speed of the cross-presser is thus controlled so as to maintain a certain amount of slack in its feed, and at the same time prevent excessive accumulation of paper between the cross-presser and the other parts of the machine.

The winder for the machine illustrated in Fig. 24, is driven by a separate variable speed drive unit 415 having a control lever 416 (Fig. 1). A pair of cone-shaped clamps 417 and 418 are attached to shafts 419 and 420, and are arranged to grip a cardboard core 421 on which the paper is wound. Shafts 419 and 420 are mounted to slide transversely and run in sleeve bushings 422 and 423. A drive shaft 424 is splined to shaft 420. A sprocket 425 driven through a suitable chain drive from variable speed drive 415 is rotatably mounted on shaft 423. A drive shaft 424 is engaged between two clutch discs 426 and 427. Disc 426 is keyed to shaft 424 and has a shoulder 426a which projects through the sprocket and is keyed to disc 427. A bearing plate 428 bears against disc 427 under the force of coil spring 429, which bears at its outer end on a threaded sleeve 430. The latter is adjustable transversely by means of a handwheel 431 to vary the spring pressure and thus vary the slippage of sprocket 425 between the clutch discs. This device limits the tension which can be built up in the feed of the paper to the winder, and thus allows the rigid forms of paper to be wound under the correct tension.

A completed roll of paper can be quickly unloaded from the winder by pulling a lever 432. This lever is pivoted on a pin 433 supported on the frame 434 of the winder and is connected at its lower end to a link 435, which is connected by links 436 and 437 to a lever 438 pivoted at 439 on the opposite side of the machine. The upper end of lever 438 is forked and carries a pair of pins 440 running in a race groove 441 on shaft 42. Lever 432 is connected to shaft 419 in a similar manner. When lever 432 is pulled to the left the clamps 418 and 419 will be pulled apart, allowing core 421 to drop down. A return spring 443 restores the clamps to their original position when lever 432 is released.

To regulate the speed of the winder for winding the elastic forms of paper, which must be wound slack to prevent deformation or stretching, a counter-balanced arm and lever regulator arrangement 442, similar in all respects to the arm and lever which regulate the speed of the cross-presser, is provided between the machine and the winder and regulates the speed of drive 415 through its control lever 416 in accordance with the amount of slack in the paper.

For applying tension to the rigid form of paper as it is wound, a pair of tension rolls 444 are mounted in any convenient location so that the paper passes over them before going to the winder. The pair of longitudinal slitting rolls may also be mounted so that the paper may pass through them before going through the winder and may be driven in any convenient manner from the main drive of the machine.

Before starting production, the mesh and spacing of the impressing rolls, and positions of the stripper fingers and guide plate are first properly adjusted according to the thickness of the material to be processed, and the maximum temperature regulator, the temperature differential regulator, and the speed temperature control are set to the proper values for the particular type of material. It may be necessary to adjust the spacing and alignment of the impressing rolls, from time to time during the run, to compensate for expansion of the rolls, in the manner previously described. With the machine in operating condition, its operation for making the various types of paper is summarized as follows, it being understood that "type I, type II," etc. are the designations of the forms of paper described in application Serial No. 520,083, filed July 5, 1955, previously referred to herein:

*Basic rigid*

This type of paper is made simply by feeding the sheet through the impressing rolls. The paper then passes around roll 225 which, in its raised position, exerts no pressure on the paper and serves merely as an idle guide roll, up around roll 235, which also serves merely as an idler, over the take-off conveyor rolls 398 and 399, and thence either through longitudinal slitting rolls to the winder, or directly to the winder by way of the tensioning rolls.

*Normal basic elastic*

To manufacture this type of paper, the first braking roll 185 is lowered into operating position. The paper passes through the impressing rolls, between roll 185 and the upper surfaces of stripper fingers 170, around rolls 225 and 235 and the rolls 398 and 399 of the take-off conveyor. The paper may then go through the slitting rolls, or to the winder. Before entering the winder, the paper drops on to the arm of regulating device 442, so that it is fed to the winder with the proper amount of slack.

*Tight basic elastic*

To manufacture this type, the plate 213 and second braking roll 225, as well as the first braking roll, are brought into operating position. The paper passes through the impressing rolls, under roll 185, between plate 213 and plate 172, under roll 225. It then follows the same path as the normal basic elastic type to the slitter or winder.

Stretched basic elastic

This type may be made from either the normal or the tight elastic type by bringing drawing roll 236 into operation and adjusting the variable speed transmission 386 to drive roll 235 at a speed of the desired ratio to the speed of feed through the impressing rolls. For stretching the normal elastic type, roll 225 is raised, the paper is passed from the first braking roll 185, around roll 225 as an idler, to rolls 235 and 236. For stretching the tight elastic type the second braking roll 225 is brought down to operating position, and the paper passes from this roll to rolls 235 and 236. In either case, the paper on leaving rolls 235 and 236, follows the same path as the other basic elastic types to the slitter or winder.

Type I

This type is made by passing the paper through the mechanisms for making either the normal or the tight elastic type and then through the crushing rolls 245 and 246 which have been adjusted to their operating position. The paper may then follow the same paths as the normal and tight elastic types, or may first be passed through the drawing rolls, as in the manufacture of the stretched elastic type.

Type II

This type is manufactured by running normal or tight elastic paper through the crushing rolls, as in making type I, then over roll 236, or between rolls 236 and 235, if a stretched product is desired. The paper then passes over the first of the driven rolls 399, and is allowed to drop freely on to the balanced arm of the regulating device 442 which controls the speed of the cross-presser. The paper is then fed through the cross-presser, the converging guides of which have been adjusted to produce the desired degree of cross-pressing. On emerging from the cross-presser, the paper may be taken to the slitters 445 or may drop on to the balanced arm of the regulating device 442 from which it is fed to the winder.

Type IIIA

This type may be made by passing the paper, as previously described through the mechanisms for making normal, tight, or stretched elastic paper. On leaving roll 235, the paper is fed over the first of the driven rolls 399 and along guide 294 to the scoring rolls 281 and 282. After passing between the scoring rolls, the paper drops on to the arm of regulating device 442, and is taken up into the cross-presser, and then carried to the slitter, or to the arm of regulating device 442, and thence to the winder.

Type IIIB

This type is ordinarily made from the stretched elastic type. The paper emerging from roll 235 passes to the first of the driven rolls 399 and then drops directly on to the arm of regulating device 442, and thereafter follows the same path as type IIIA, through the cross-presser and then to either the slitter or the winder.

Type IV

This type is made by cross-pressing the basic rigid type of paper. The paper travels along the usual path for the rigid form until it reaches the first of the driven rolls 399. It then drops down on to the arm of regulator 442 and is taken up into the cross-presser. On emerging from the cross-presser, the paper travels up over the last of driven rolls 399 and either through the slitter to the winder, or through the tensioning rolls 445 to the winder.

The conversion of the machine from one type of production operation to another requires no lengthy shutdown period, as the mechanisms for performing the various steps following the initial hot impressing can be quickly put in or out of operation by turning the appropriate handles. Any necessary adjustments necessary for smooth operation, for example, the adjustment of the guides which line the paper up with the crushing or scoring rolls, or adjustment of the pressure of the braking rolls or spacing of the guide plates may be made while the machine is running.

What is claimed is:

1. A machine for manufacturing formed paper comprising: means for impressing parallel zigzag rows of undulations in a flat sheet of paper; means for feeding the sheet of paper continuously to said impressing means and continuously taking off impressed paper therefrom; means for operating on the impressed paper to impart flexibility and extensibility thereto in the direction perpendicular to said rows; means for operating on the impressed paper to impart flexibility thereto in the direction parallel to said rows; means for operating on the impressed paper to impart extensibility thereto in the direction parallel to said rows; and means for selectively transmitting the paper from said impressing means to any selected one of said three means for operating on the impressed paper, whereby the machine can be adapted to produce formed papers of various types.

2. A machine for manufacturing formed paper comprising: means for impressing parallel zigzag rows of undulations in a flat sheet of paper; means for feeding the sheet of paper continuously to said impressing means and continuously taking off impressed paper therefrom; compressing means for compressing the impressed paper and thereby imparting flexibility and extensibility thereto in the direction perpendicular to said rows; indenting means adapted to weaken portions of the impressed paper to impart flexibility thereto in the direction parallel to said rows; transverse pressing means for compressing the impressed paper, and thereby imparting extensibility thereto, in the direction parallel to said rows; and means for selectively transmitting the paper from said impressing means to any selected one of said compressing means, said indenting means, and said transverse pressing means to produce formed papers of various types.

3. A machine as described in claim 2, having means for stretching the paper, subsequent to operation thereon by said compressing means, to alter its extensibility in the direction perpendicular to said rows.

4. A machine as described in claim 2, having means for continuously transmitting paper to said transverse pressing means with a controlled amount of slack.

5. In a paper forming machine, of the type employing a pair of heated, driven impressing rolls having meshing toothed surfaces adapted to impress regular parallel zigzag rows of undulations in paper passing between the rolls, a first impressing roll, a fixed bearing supporting one end of said roll and an axially movable bearing supporting the other end of the roll; a second impressing roll cooperating with said first roll, a pair of axially movable bearings, one supporting each end of said second roll; and means for axially shifting the bearings of said second roll and locking them in any desired axial position while the rolls are running.

6. In a paper forming machine of the type employing a pair of driven impressing rolls having meshing toothed surfaces adapted to impress regular parallel zigzag rows of undulations in paper passing between the rolls, electrical heating means for each of said rolls; means for supplying current to said heating means; a first temperature detecting element disposed to detect the temperature of one of said rolls; a second temperature detecting element disposed to detect the temperature of the other of said rolls; and means controlled by said temperature detecting elements and adapted to control said current supplying means in such a manner as to maintain the relative temperatures of said rolls with respect to each other within selected limits.

7. In a paper forming machine of the type employing a pair of heated, driven impressing rolls having meshing toothed surfaces adapted to impress regular parallel zigzag rows of undulations in paper passing between the rolls;

means for driving said rolls in unison at variable speed; a temperature detecting element disposed to detect the temperature of said rolls; and means controlled by said temperature detecting element and adapted to control the speed of said driving means in accordance with fluctuations in the temperature of said rolls.

8. In a paper forming machine of the type employing a pair of driven impressing rolls having meshing toothed surfaces adapted to impress regular parallel zigzag rows of undulations in paper passing between the rolls, a first guide partially surrounding one of the rolls and holding the paper in contact therewith over part of the circumference thereof, and a braking device subsequently engaging the paper to form the impressed paper into pleats and simultaneously increase its overall height; a second guide adapted to carry the paper, as it emerges from between the first guide and its associated roll, to said braking device; and a guard member mounted to project into the path of the paper as the latter travels from said first guide to said braking device, said guard member being spaced at such distance from said second guide as to permit passage of impressed paper emerging from the first guide and to prevent backward passage of paper which has been pleated by said braking device.

9. A machine for manufacturing formed paper, comprising: a pair of driven impressing rolls, having meshing toothed surfaces adapted to impress parallel rows of zigzag undulations in a sheet of paper passing between the impressing rolls; a first braking device adapted to engage, and press on, paper emerging from said impressing rolls; a second braking device adapted to engage, and press on, paper emerging from said first braking device; a pair of members having spaced parallel flat surfaces disposed to confine the paper, in the direction perpendicular to the sheet, as it passes from the first to the second braking device; means for independently adjusting the pressure of said first and second braking devices on the paper; and means for selectively moving said braking devices and one of said members out of operative position with respect to the paper.

10. In a machine of the type employing a pair of continuously driven impressing rolls having meshing toothed surfaces adapted to impress spaced parallel zigzag rows of undulations, having evenly spaced alternating vertices, in paper passing between the rolls, a device for crushing the impressed paper along selected lines perpendicular to the rows comprising: a pair of mating parallel crushing rolls, each having circumferential V-shaped ribs provided with substantially flat outer rims spaced to correspond to alternate ones of said vertices, the rims of one crushing roll being staggered with respect to the rims of the other, said crushing rolls being adapted to engage between them impressed paper emerging from the impressing rolls; means for heating said crushing rolls; and means for continuously driving said crushing rolls to move the paper between them.

11. In a machine as described in claim 9, means for varying the spacing between said crushing rolls in the region of their engagement with the paper.

12. In a machine as described in claim 9, a guide member arranged to transmit paper, received from the impressing rolls, to the crushing rolls, and to align the paper so that the rims of the crushing roll ribs engage alternate vertices of each row of undulations, as the paper passes between the crushing rolls.

13. In a machine of the type employing a pair of continuously driven impressing rolls having meshing toothed surfaces adapted to impress parallel zigzag rows of undulations, having evenly spaced alternating vertices, in a sheet of paper passing between the rolls, means for indenting the impressed paper, along selected lines perpendicular to said rows comprising: a pair of parallel, mating, scoring rolls, each scoring roll carrying a number of circumferential fins spaced to correspond to alternate ones of said vertices, the fins of one scoring roll being staggered with respect to the fins of the other, and the scoring rolls being adapted to engage between them impressed paper received from the impressing rolls; and means for continuously driving said scoring rolls to move the paper between them.

14. In a machine as described in claim 13, a guide member mounted to transmit paper, received from the impressing rolls, to the scoring rolls, and to align the paper so that the fins of the scoring rolls engage alternate vertices of each row of undulations in the paper as it passes between the scoring rolls.

15. A device for imparting transverse extensibility to a sheet of formed paper having upper and lower surfaces impressed with parallel zigzag rows of undulations, comprising: means for continuously advancing the sheet in a direction perpendicular to the rows, while confining the sheet in a direction perpendicular to its surfaces; and means for progressively compressing the sheet, while so confined, in the direction of the rows.

16. A device for imparting transverse extensibility to a sheet of formed paper having upper and lower surfaces impressed with transverse parallel zigzag rows of undulations, and longitudinal edges, comprising: a pair of endless conveyors having paths with adjoining straight portions defining a working region, each conveyor being composed of a number of straight cross bars adapted to form a substantially continuous flat surface when travelling through said working region, said conveyors being adapted to engage the paper between them in said working region with the surfaces formed by said bars substantially engaging the upper and lower surfaces, respectively, of the paper; means for continuously driving said conveyors to advance the paper disposed in said region along the direction parallel to the longitudinal edges of the paper; two sets of oppositely disposed pressing plates, travelling with said bars, each set of said plates being adapted to engage one of said longitudinal edges as the paper moves through said working region; and means for progressively moving each plate of said sets of pressing plates, as it travels through said region, transversely toward the opposite set, so as to progressively compress the paper in the transverse direction.

17. A device as described in claim 16, having a pair of backing plates, each of said backing plates being mounted to engage the bars of one of the conveyors in said region and to hold the bars straight.

18. A device as described in claim 16, having means for relatively shifting the paths of the conveyors to vary the spacing and angle of the conveyors with respect to each other in said region.

19. A device as described in claim 16, the sets of presser plates having inner end surfaces sloping in the general direction of the path of the plates through said working region, said end surfaces of each set forming a saw tooth profile when engaged with the paper.

20. A device as described in claim 16, having means for moving each of said presser plates, after passing through said region, transversely away from the opposite set.

21. A device for imparting transverse extensibility to a sheet of formed paper having upper and lower surfaces impressed with transverse parallel zigzag rows of undulations, and longitudinal edges, comprising: a pair of endless conveyors having paths with adjoining straight portions defining a working region, each conveyor being composed of a number of straight cross bars adapted to form a substantially continuous flat surface when travelling through said working region, said conveyors being adapted to engage the paper between them in said working region with the surfaces formed by said bars substantially engaging the upper and lower surfaces, respectively, of the paper; means for continuously driving said conveyors to advance the paper disposed in said region along the direction parallel to the longitudinal edges of the paper; a pair of presser plates mounted to slide transversely on each cross-bar of one of said conveyors and adapted to engage the longitudinal edges of the paper; means for moving the presser plates of each of said pairs of plates on converging paths through said region; and means for varying the convergence of said paths.

22. A device as described in claim 21, in which each presser plate carries a pin with a roller mounted thereon, and the means for moving said plates on converging paths comprises a pair of guide bars adapted to engage the rollers.

23. A device as described in claim 21, in which each presser plate has an outer end portion, and the means for moving said plates on converging paths comprises a pair of chains adapted to engage said outer ends and driven in the same general direction as the conveyors in said region.

References Cited in the file of this patent

UNITED STATES PATENTS

| | | |
|---|---|---|
| 2,034,862 | Dunham | Mar. 24, 1936 |
| 2,623,572 | Haas | Dec. 30, 1952 |
| 2,635,825 | Stanford | Apr. 21, 1953 |
| 2,736,363 | Elkins | Feb. 28, 1956 |

FOREIGN PATENTS

| | | |
|---|---|---|
| 403,328 | Italy | Sept. 6, 1945 |